US012671794B2

(12) United States Patent
Ghazal

(10) Patent No.: US 12,671,794 B2
(45) Date of Patent: Jun. 30, 2026

(54) VIRTUAL REALITY (VR) CONTROLLED SYSTEM FOR REMOTE WIRING AND MEASUREMENT OF ELECTRONIC CIRCUITS ON A TRAINER

(71) Applicant: Abu Dhabi University, Abu Dhabi (AE)

(72) Inventor: Mohammed Ghazal, Abu Dhabi (AE)

(73) Assignee: Abu Dubai University, Abu Dhabi (AE)

( * ) Notice: Subject to any disclaimer, the term of this patent is extended or adjusted under 35 U.S.C. 154(b) by 0 days.

(21) Appl. No.: 18/972,655

(22) Filed: Dec. 6, 2024

(65) Prior Publication Data

US 2026/0163997 A1      Jun. 11, 2026

(51) Int. Cl.
*H04N 7/18*        (2006.01)
*G06V 10/10*       (2022.01)
*G06V 10/34*       (2022.01)
*G06V 20/60*       (2022.01)
*G09B 9/00*        (2006.01)

(52) U.S. Cl.
CPC ............. *H04N 7/181* (2013.01); *G06V 10/16* (2022.01); *G06V 10/34* (2022.01); *G06V 20/60* (2022.01); *G09B 9/00* (2013.01)

(58) Field of Classification Search
None
See application file for complete search history.

(56) References Cited

U.S. PATENT DOCUMENTS

| | | | |
|---|---|---|---|
| 2017/0080565 A1* | 3/2017 | Dalibard | B25J 9/1694 |
| 2017/0148186 A1* | 5/2017 | Holzer | G06T 7/337 |
| 2019/0082103 A1* | 3/2019 | Banerjee | G06T 7/292 |
| 2019/0156145 A1* | 5/2019 | Pourian | G06F 18/22 |
| 2020/0388074 A1* | 12/2020 | Kloor | G06F 21/6209 |
| 2023/0071690 A1* | 3/2023 | Nakakura | H04N 13/194 |
| 2023/0139454 A1* | 5/2023 | Kloor | G06V 10/82 |
| | | | 348/158 |

* cited by examiner

*Primary Examiner* — Daniel T Tekle

(57) ABSTRACT

A method includes receiving, by a computing device, multiple camera frames from a first location. The method includes stitching, by the computing device, the multiple camera frames in real time. The method includes transmitting, by the computing device, the stitched multiple camera frames to a user device. The user device located at a second location is configured to control a device at the first location.

8 Claims, 32 Drawing Sheets

| Gate | IC Chip |
|------|---------|
| AND | 74LS08 |
| OR | 74LS32 |
| NAND | 74LS00 |
| NOR | 74LS02 |
| XOR | 74LS86 |
| XNOR | 74LS66 |
| NOT | 74LS04 |
| Encoder | 74LS151 |
| Decoder | 74LS138 |
| MUX | 74LS151 |
| DEMUX | 74LS138 |
| Full Adder | 74LS283 |
| Quad Tri-State Buffer | 74LS125 |
| Priority Encoder | 74LS148 |

Figure 18:
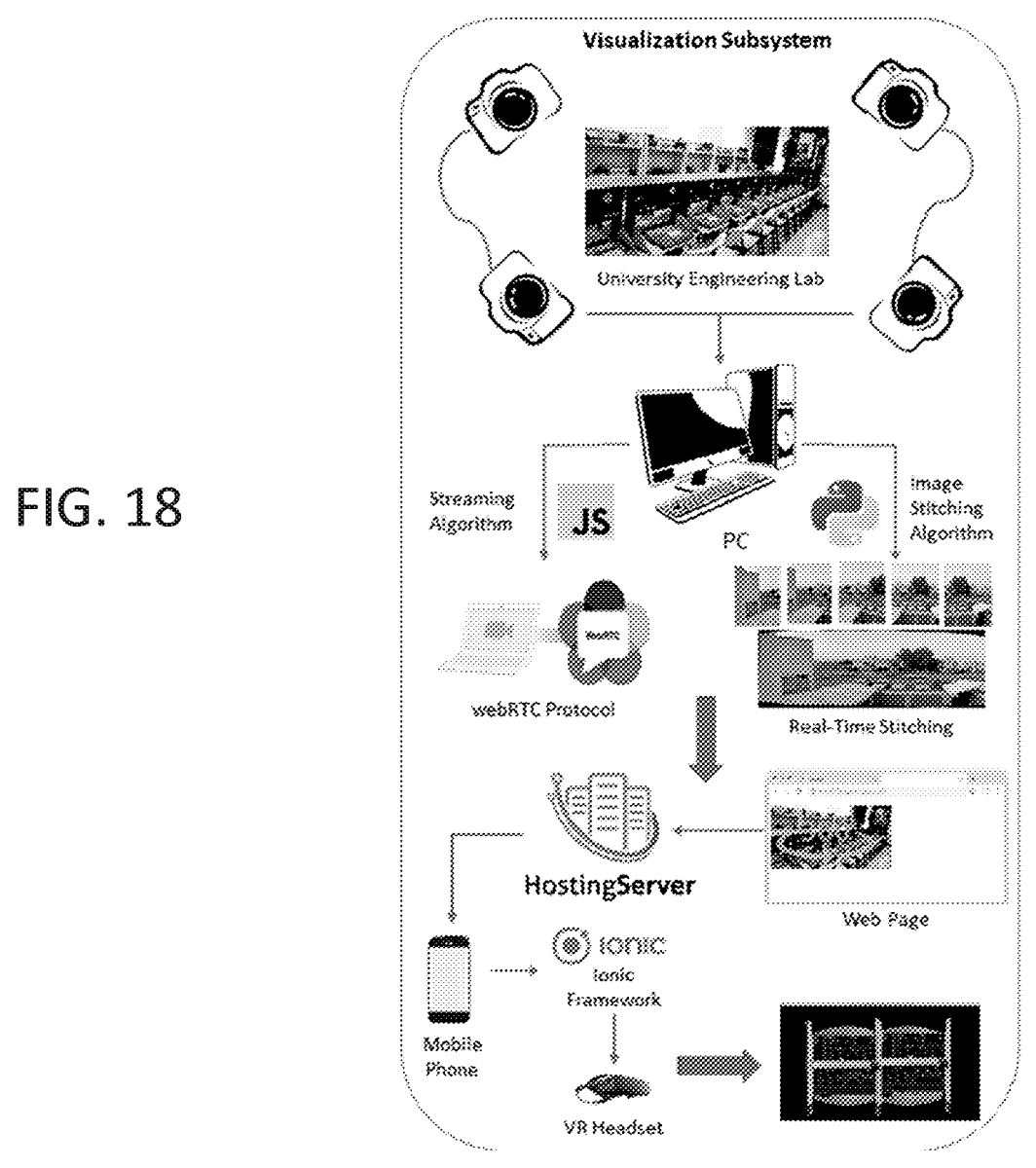

Visualization Subsystem

University Engineering Lab

Streaming Algorithm

JS

PC

Image Stitching Algorithm webRTC Protocol

Real-Time Stitching

HostingServer

Web Page

Mobile Phone ionic
Ionic Framework

VR Headset

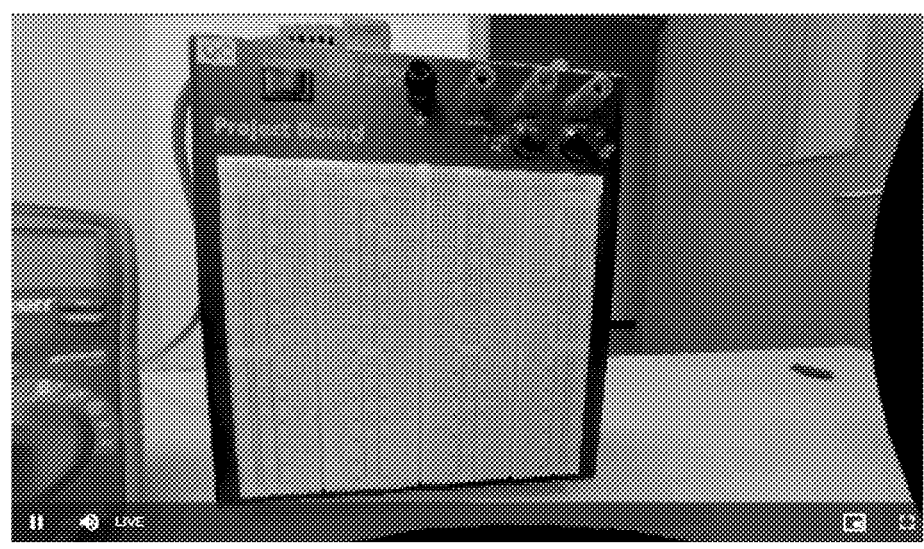
FIG. 23
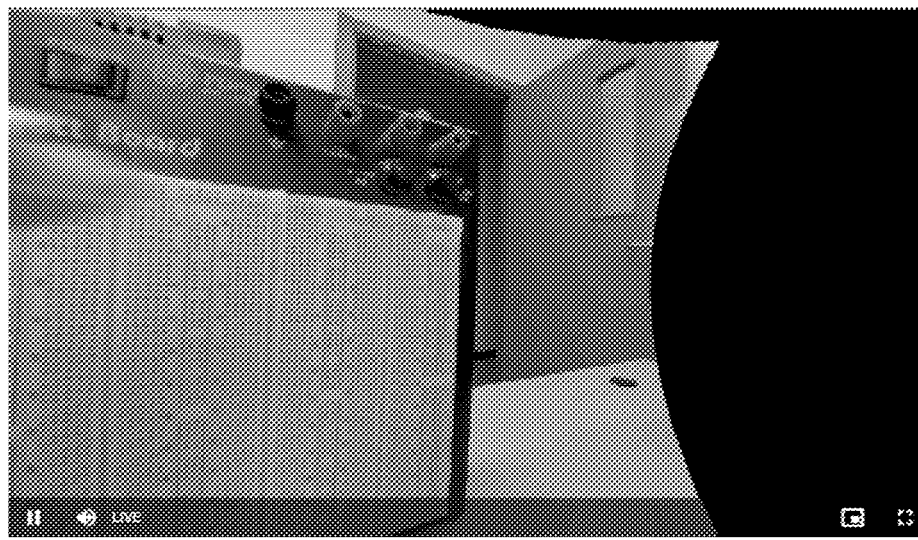

3100

3200

VIRTUAL REALITY (VR) CONTROLLED SYSTEM FOR REMOTE WIRING AND MEASUREMENT OF ELECTRONIC CIRCUITS ON A TRAINER

BACKGROUND

E-learning has increasingly become common in educational environments. For example, e-learning is being used for laboratory classwork and includes either pre-recorded content or using various types of simulators. However, such e-learning systems limit a student's ability to interact with laboratory equipment located in a different location from where the student is located. Other types of e-learning include virtual interactive laboratory test systems. However, such systems have a high production/financial cost to implement and are limited in their practicality There is currently no low-cost system that can enhance student engagement within a laboratory setting and further allows students to make mistakes in a safe environment.

BRIEF DESCRIPTION OF DRAWINGS

FIGS. 3A-3C and 4A-4C are diagrams of an example circuits;

FIG. 5 is a diagram of an example table;

FIGS. 9, 10, and 11 are diagrams of example finite state boards;

FIGS. 16, 17, and 18 are diagrams of an example VR control system;

FIG. 23 is a diagram of an example streaming process;

DETAILED DESCRIPTION OF PREFERRED EMBODIMENTS

The following detailed description refers to the accompanying drawings. The same reference numbers in different drawings may identify the same or similar elements.

Systems, devices, and methods described herein include a virtual reality (VR) control system that provides for remote wiring and measurement of electronic circuits on a trainer board at one location (e.g., a classroom, laboratory, etc.), enabling students to do experiments, at another location, via a virtual reality (VR) streaming and trainer control. In embodiments, a location may have a particular number of cameras (e.g., six) that may be programmed to record the trainer board and parameters. In embodiments, the VR control system may stream stitched videos (e.g., connected) to a mobile application based on a real-time stitching process and Web VR technology. In embodiments, a user may receive a VR video broadcast from the lab, and then the user may use a controller to control a robotic arm installed in the lab.

In embodiments, the real-time stitching process can stitch together multiple camera frames into a virtual environment and stream the stitched footage in real time. Accordingly, the systems, methods, and devices described herein allow for stitching and transmitting real-time VR content, enabling a user (such as a student) to conduct lab experiments remotely from a laboratory, classroom, etc. As such, a robotic device is capable of precise movement and connection placement. Additionally, the systems, methods, and devices described herein allow for connecting a VR controller and use the controlling mechanism smoothly without any interruptions to the movement of the robotic device. In addition, the systems, methods, and devices described herein permit the transmission of VR videos with no latency issues.

Furthermore, the mobile application described herein is easy to use and secure. Accordingly, adopting this technology should benefit users enrolled in remote learning by enhancing their laboratory experience; plus, the systems, methods, and devices described herein provide a type of VR lab setup that will boost students' engagement and performance during remote learning sessions.

Accordingly, a Virtual Reality (VR) controlled system for remote wiring and measurement of electronic circuits on a trainer is provided. To achieve this goal, the systems, methods, and devices described herein provide a 360-degree image stitching algorithm, a real-time streaming technique, and an accurate controlling system based on the controls from the end user's side to allow controlling the trainer board remotely.

Figure 1:
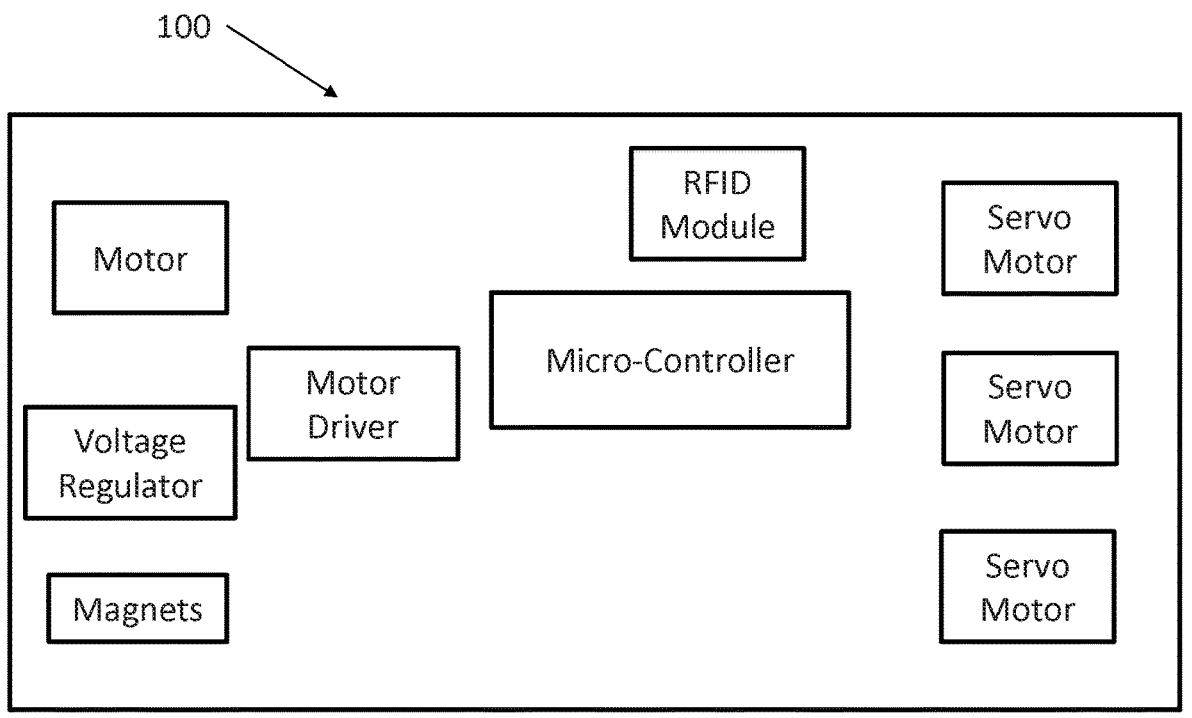
FIG. 1 is a diagram of an example circuit schematic design.

In addition, the systems, methods, and devices described herein may also provide for (a) design and fabrication of a trainer board with a 2D moving head that allows accurate connection placement on the board, (b) design and implementation of a VR system with video feedback to enable controlling the trainer board remotely, (c) testing the proposed system on different circuits, (d) a trainer size (should not exceed the size of the working bench in the lab), (e) the system should be designed to operate with low power consumption, (f) usability with precise control of a moving head using controller commands, and (g) cross-platform applications In embodiments, one or more of the following standards may be used by the VR control system: ANSI/APC-2221—Generic Standard on Printed Circuits Board, 1998, IPC Association; IEEE 802.11a-1998—IEEE Standard for Tele-communications and Information Exchange Between System—LAN/-MAN Specific Requirements—part11: Wireless Medium Access Control (MAC) and physical layer (PHY) specifications: High-Speed Physical Layer in the 5 GHz band, 1999, the IEEE; IEEE 802.15.1-2005 IEEE Standard for Information technology—Local and metropolitan area network—Specifications for Wireless Personal Area Networks (WPAN); IEEE Standard Glossary of Image Processing and Pattern Recognition Terminology.; Frequency Band Standard for Wireless Communication (Bluetooth); and OMG Unified Modeling Language FIG. 1 describe an example hardware schematic 100 of a robotic device. In embodiments, as shown in FIG. 1, the hardware 100 includes a microcontroller (Arduino) connected to multiple components. In embodiments, there are three servo motors connected to PWM pins which control linear sliders (moving in x and y directions), and three DC motors (one is responsible for moving in the z-axis to pick/drop wires, and the other two are responsible for controlling the voltage output of the power supplies). In addition, an electric magnet is mounted onto the robotic arm connected to the motor driver's output pin.

Accordingly, the electric magnet becomes powered on when the z-axis linear actuator is on and powered off when the electric magnet releases the wires. In embodiments, all three DC controllers are connected to motor drivers to change the motor's directions. In embodiments, the main power supply is 12V. In addition, parallel to the power supply, buck converters are provided which steps down the voltage to 4.7V for the servo motors (the sliders). In embodiments, the output pin of the linear actuator is also connected to a buck converter, which steps down the voltage to 6V for the electric magnet.

In embodiments, the printed circuit boards (PCBs) in FIGS. 2, 6, 7, and 8 were built on a specified standard. In embodiments, the PCB sizes were all fixed to 410×265 mm with 2 layers of copper; however, other PCB sizes may be used. Also, all the pads' sizes were fixed to 8 mm to be used as an electric wiring mechanism. Furthermore, all the PCBs had plenty of empty pads placed at the bottom of the board. These pads are the wires deck in which the wires will be hung.

Figure 2:
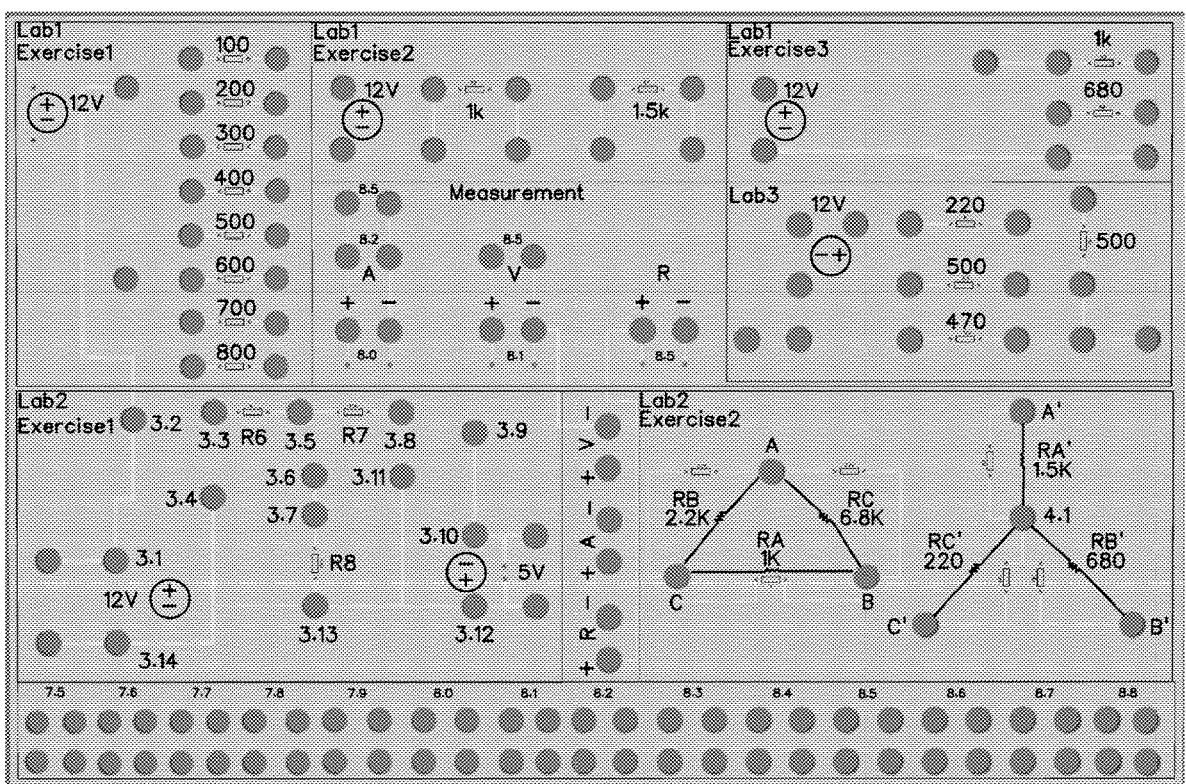
FIG. 2 is a diagram of an example printed circuit board.
Figure 3A:
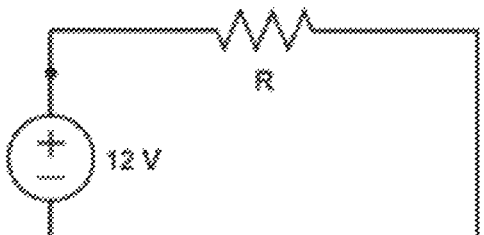
Figure 3B:
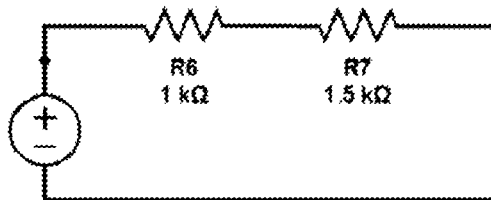
Figure 3C:
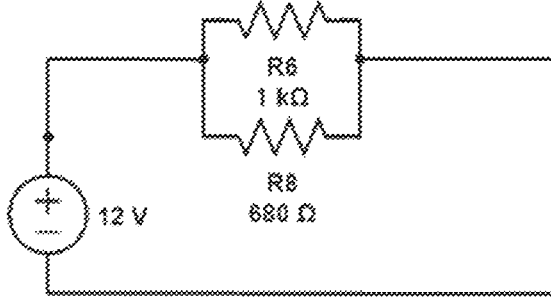

FIG. 2 describes the first PCB. In embodiments, the first PCB is designed to cover one or more examples of electric circuit concepts and content. For example, in the first exercise, students' experiment with Ohm's Law and practically verify its equation using the circuit shown in FIG. 3A. In another exercise, students can study the voltage divider circuit and verify its formula using the circuit in FIG. 3B. In a third exercise, part of the PCB is to connect PCB pads to achieve the circuit and its connections to that shown in FIG. 3C.

Figures 4A, 4B, 4C:
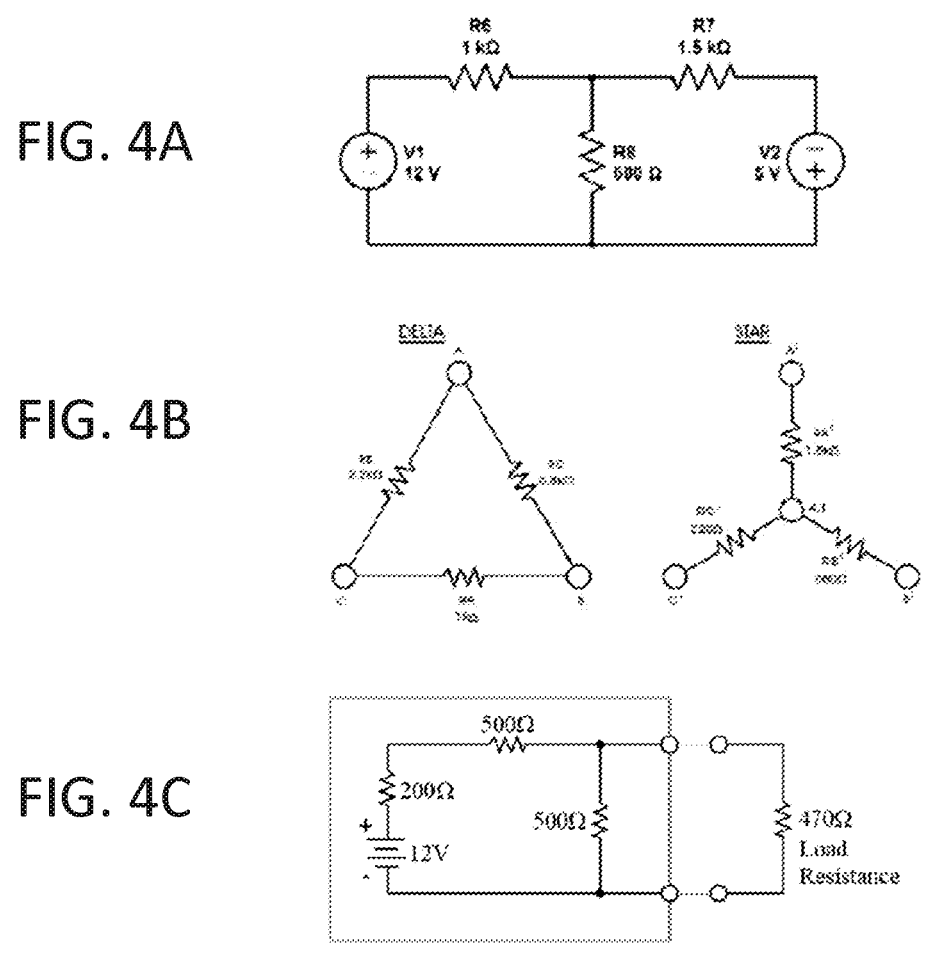

Thus, conducting exercises using the PCB described in FIG. 2 are designed to implement electric circuit concepts practically. In embodiments, the first exercise will experimentally study and verify the superposition theorem. In the second exercise, the student will be working on the Star-Delta transformation. FIG. 4A describes a superposition circuit that can be practically verified by measuring its currents. FIG. 4B describes circuits used to test the Star-Delta circuits transformation.

In embodiments, the first PCB can be used to apply and verify Thevenin's and Norton's theorems in a third set of exercises. In the first exercise of the third set of exercises, users may apply Thevenin's theorem to solve their circuit. Hence, users will measure and calculate Thevenin open circuit voltage Eo and Thevenin impedance r. Then, in the second exercise of the third set of exercises, users can apply Norton's theorem to solve their circuit. Users can then measure and calculate Norton short circuit current Isc. FIG. 4C demonstrates the original circuit in which students apply both Thevenin's and Norton's Theorems.

Figure 6:
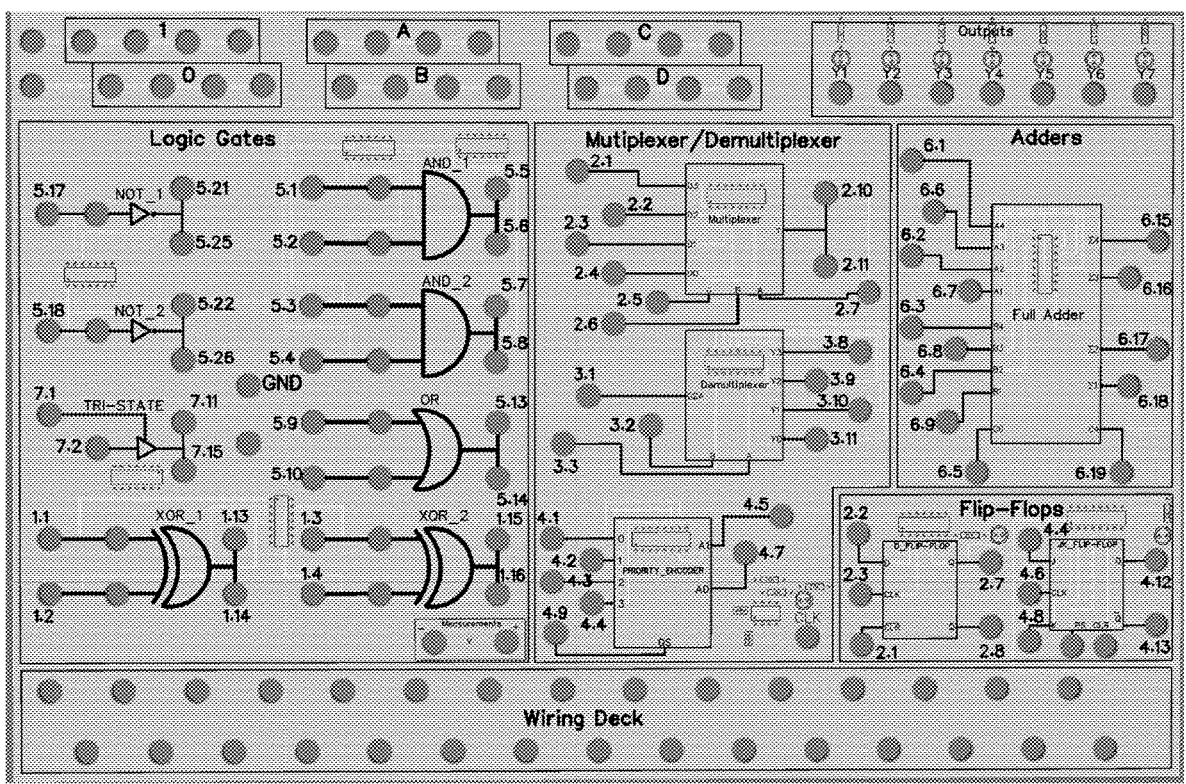
FIGS. 6, 7, and 8 are diagrams of example printed circuit boards.

FIG. 6 describes a second PCB. In embodiments, The PCB design covers several digital circuit concepts and course material. In embodiments, the board's top part, pads are connected to 5V and GND (ground). Thus, users can connect the 5V as a binary value of 1 and connect the GND as a binary value of 0 to the inputs A, B, C & D. Thus, the second PCB here is designed using the following integrated circuit (IC) Chips in the table described in FIG. 5.

FIG. 6 describes how to demonstrate lab experiments from an example digital circuits course. For example, some of the experiments that can be tested on the PCB, such as equivalent logic circuits, verification of gate arrangement derived from a three-variable Karnaugh map, characteristics of the EX-OR & EX-NOR circuit, characteristics of Half Adder circuit, characteristics of a 4-2 line encoder circuit, characteristics of a 2-4 line decoder circuit, characteristics of a 4-input multiplexer circuit, characteristics of a 1 to 1-of-4-line demultiplexer circuit, magnitude comparator circuits, characteristics of a 4-bit Full Adder circuit, characteristics of a NAND Gate S-R Latch, D-Type Flip-Flop, and characteristics of a J-K Flip-Flop.

Figure 7:
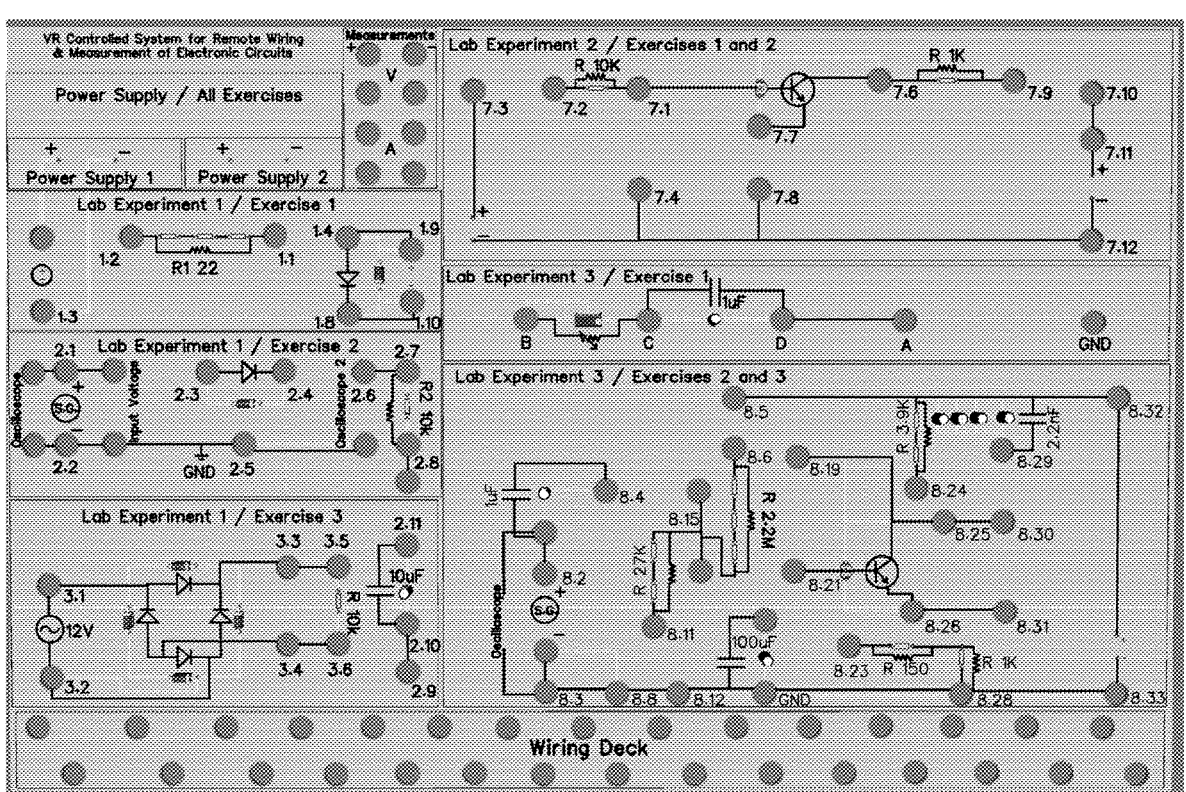
Figure 8:
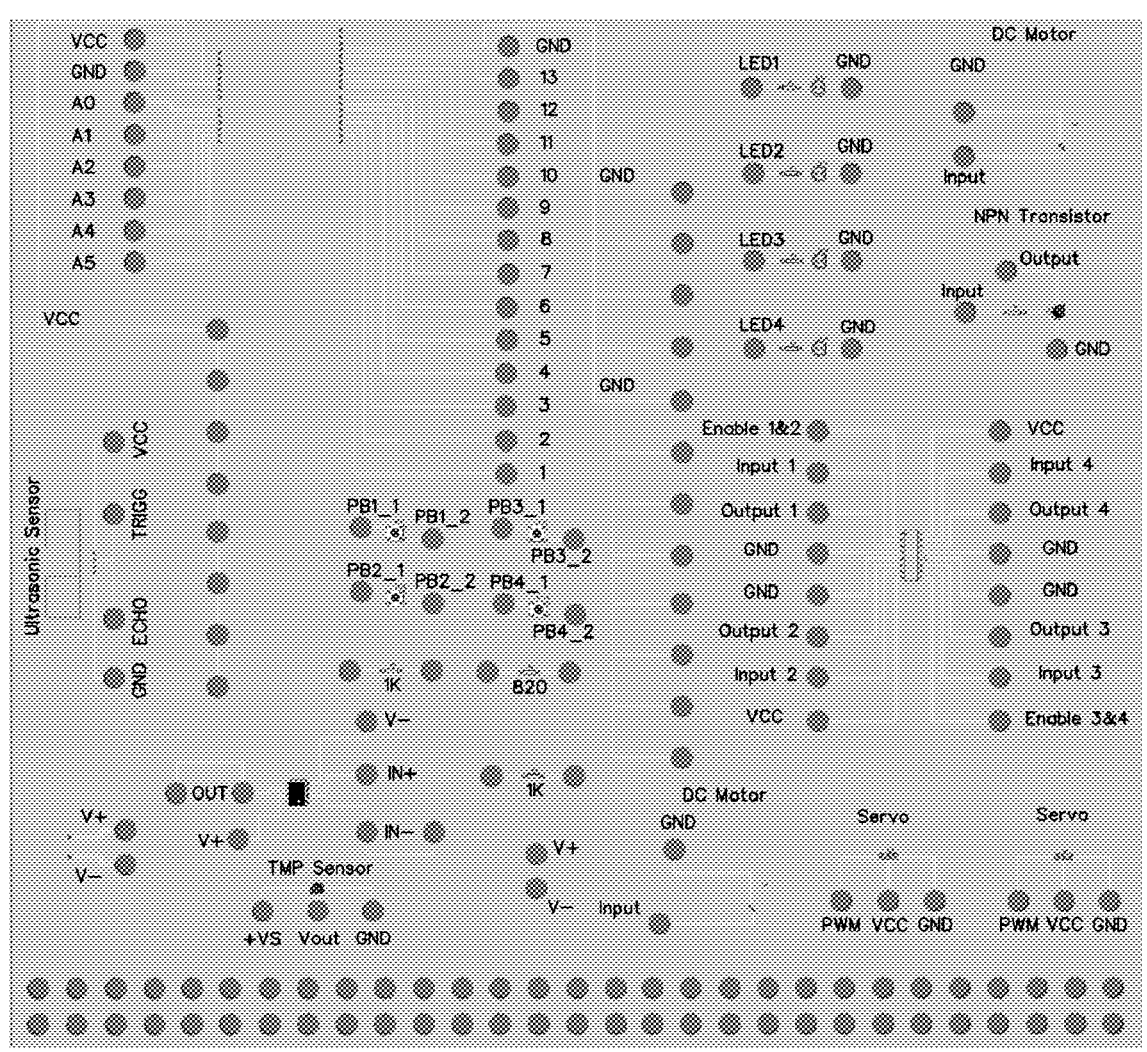

FIG. 7 describes a third PCB. In embodiments, the third PCB can be used to teach additional electronics circuit concepts, such as P-N junction diode, half-wave rectifier, bridge (full-wave) rectifier, current gain, transistor output characteristic, voltage amplification, need for bias, stage gain, and input impedance FIG. 8 describes a fourth PCB. In embodiments, the fourth PCB is designed to cover some firmware programming experiments, such as sensors experiments, motors, push buttons, and LEDs. In embodiments, the fourth PCB contains an Atmega328, LEDs, servos, push buttons, DC Motors, servo motors, temperature sensors, and ultrasonic sensors.

Figure 9:
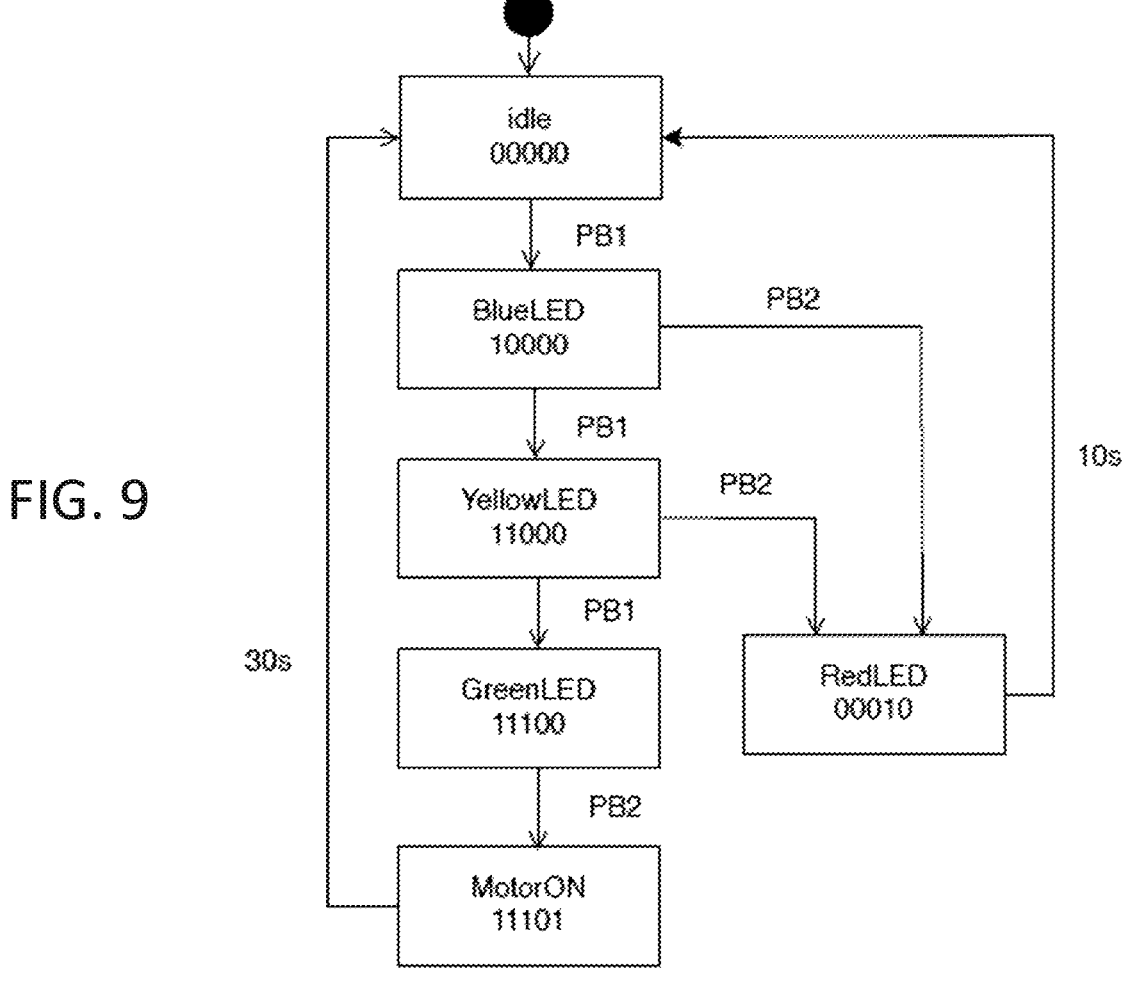
Figure 10:
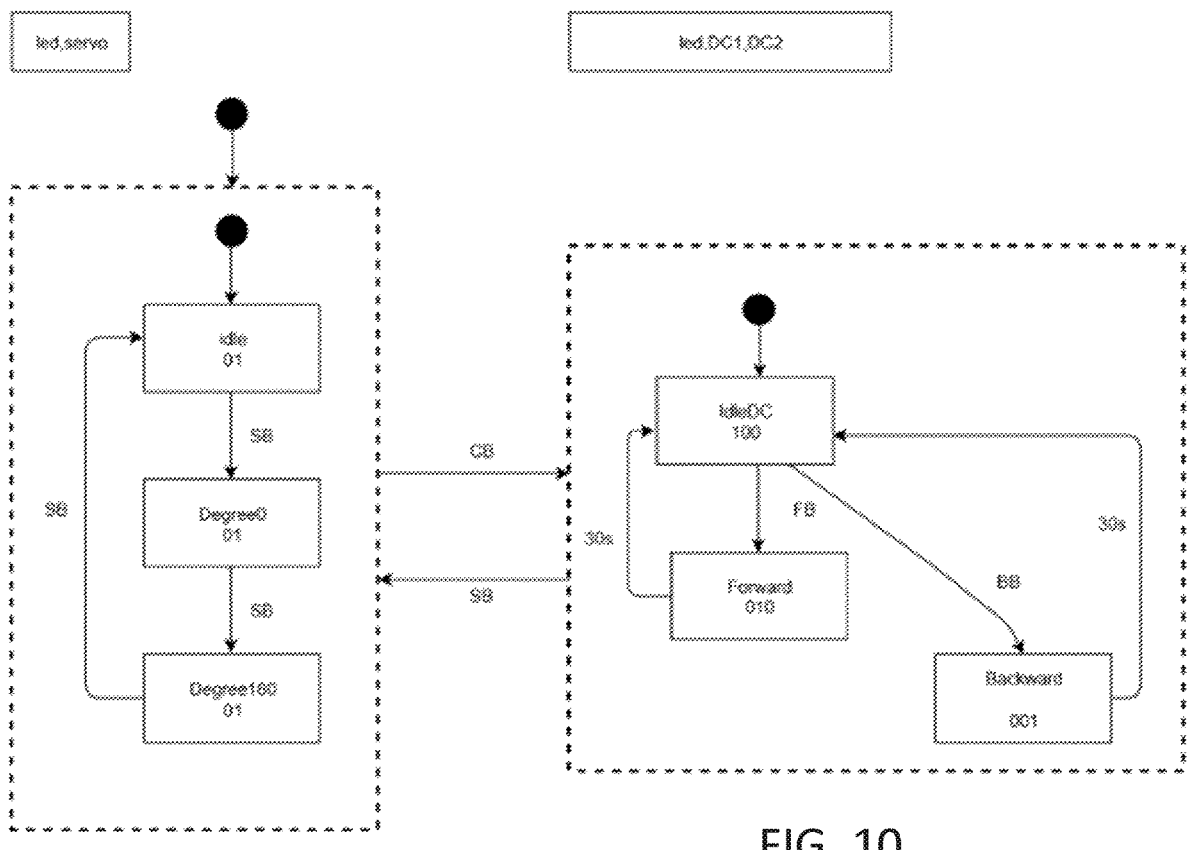
Figure 11:
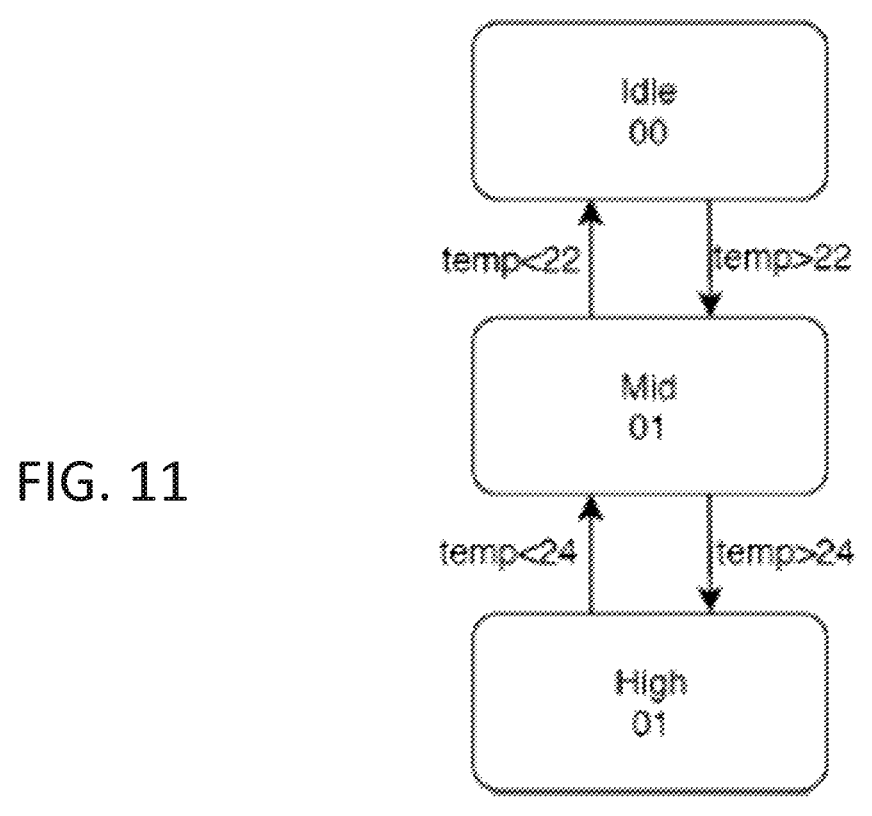

For the fourth PCB, in the first lab, users can experiment with digital input and output of the Arduino UNO. A system can be designed to turn on a DC motor once it is fully charged. If the motor is turned on without fully charging, it will discharge automatically. In a second lab, using the fourth PCB, a user can control motors and LEDs using the Arduino UNO depending on sensor readings. A user can design two systems. In the first part, the system reads the temperature from a sensor and control the speed of the motor accordingly. In the second part, the system can read from an ultrasonic sensor and control LEDs. In the third lab, users control motors using the Arduino UNO. In embodiments, the user can design a system that uses a servo motor to set a direction and then turns on a DC motor to move forward or backward. FIGS. 9, 10, and 11 describe finite state machines (FSMs) in schematic diagrams that can be implemented on a PCB based on the design of the experiments.

In embodiments, video stitching is critical in smoothly merging multiple videos to generate a panoramic video with a larger field of view (FOV) and resolution. While video stitching is similar to image stitching, video stitching has more challenging issues. The primary limitation of real-time video stitching is the trade-off between stitching effect and stitching speed (which are issues resolved by the systems, methods, and devices described herein).

Figure 12:
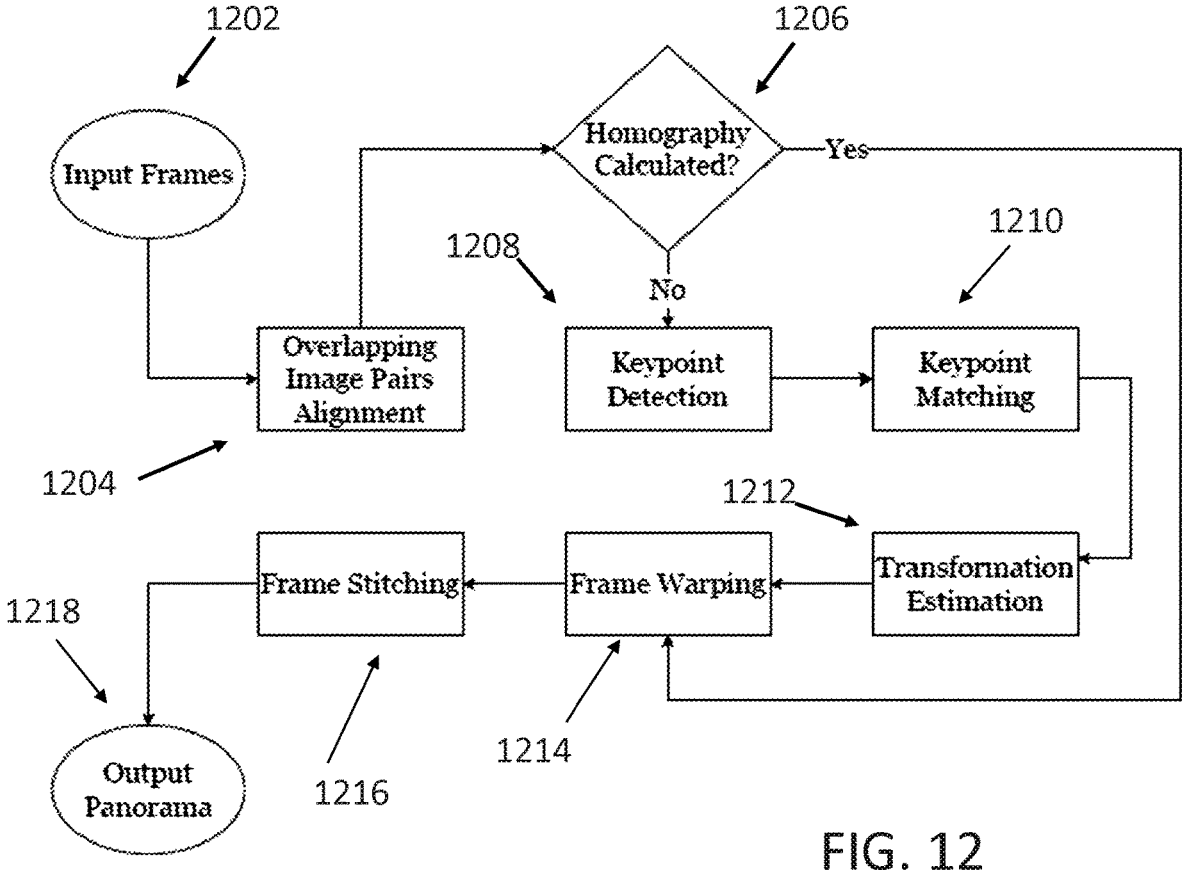
FIG. 12 is a diagram of an example flow chart.
Figure 13:
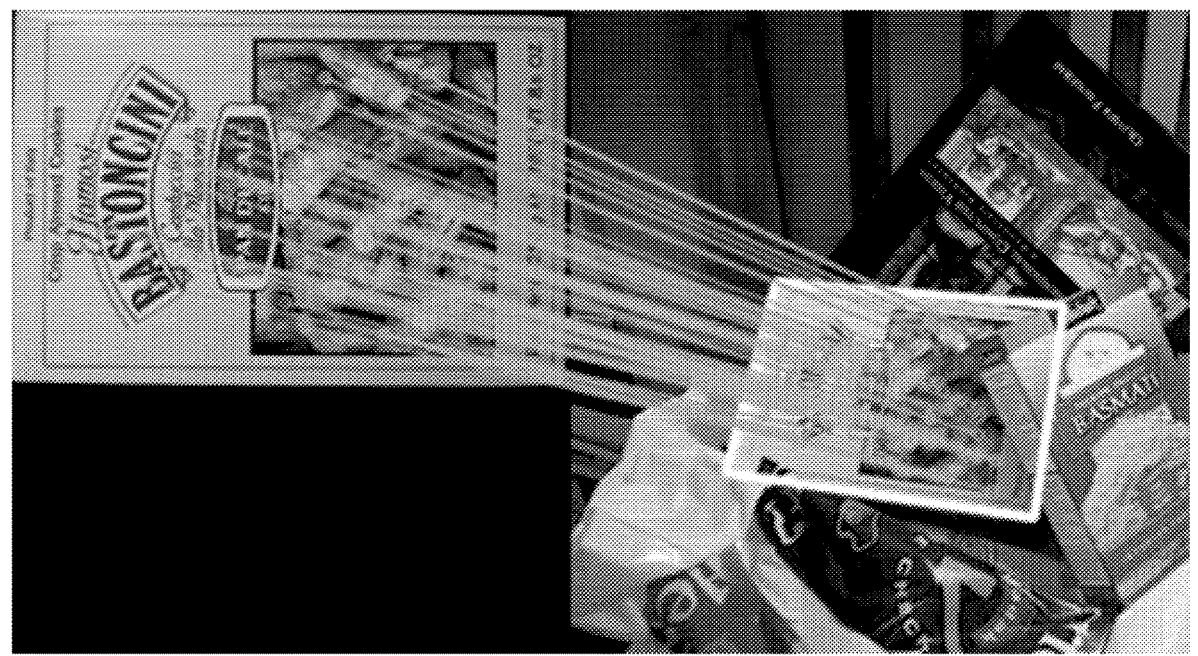
FIG. 13 is a diagram of an example keypoint matching.

While stitching with frame-by-frame registration results in precise alignment, it can be time-consuming and computationally demanding. In embodiments, a fixed homography method for video stitching can significantly minimize the amount of computing processing, memory, and hardware requirements. This is because, during the calibration phase, keypoint detection, keypoint matching, and transformation estimation are all done simultaneously. Thus, the same pre-calculated homography matrix is then used to warp all subsequent video frames. FIG. 12 describes a flowchart for real-time video stitching. As shown in FIG. 12, at step 1202, frames are inputted. At step 1204, overlapping image pairs are aligned. At step 1206, calculation of homography is determined. If homography is not required (NO), then keypoint detection is conducted at step 1208. At step 1210, keypoint matching is conducted. At step 1212, a transformation estimation is conducted. At step 1214, frame wrapping is conducted. If calculation of homograph is required (YES at step 1206), then the flow goes to step 1214. At step 1216 frame stitching is undertaken. At step 1218, an output panorama is displayed.

Depending on the application, features may refer to specific locations in images, such as mountain tops, building corners, or other properties of the object being captured (e.g., referred to as key-point features) and they are distinguished by the appearance of patches of pixels surrounding the position of the point of interest in the image. In embodiments "keypoint detection" refers to the process of recognizing the important characteristics of a picture. (which is further described in the steps of FIG. 12). In embodiments, a Scale Invariant Feature Transform (SIFT) algorithm is incorporated into our stitching pipeline. In embodiments, the SIFT algorithm consists of four steps.

In the first step, scale-space extrema detection is performed. Utilizing the same window to identify keypoints of varying scales is not feasible. Accordingly, scale-space filtering is employed to accomplish this. For the image with various σ values, the Laplacian of Gaussian (LoG) is calculated during scale-space filtering. In embodiments, LoG serves as a blob detector, detecting blobs of varying sizes due to changes in the σ value. In embodiments, σ operates as a scale parameter. For example, the Gaussian kernel with low σ yields a high value for a small corner, but the Gaussian kernel with high σ provides a good match for the larger corner. As a result, we can discover that the local maxima can be determined throughout the scale and space, which includes a list of (x, y, σ) values, indicating a possible keypoint at (x, y) at σ scale.

In the second step, keypoint localization is performed. After identifying possible keypoint locations, the keypoint locations are filtered to get more precise results. To obtain a more accurate location of extrema, a Taylor series expansion of scale space is utilized. If the intensity at these extrema is less than a predefined threshold, typically 0.03, it is discarded. Because the DoG responds more strongly to edges, they must also be eliminated. In embodiments, this is accomplished through the employment of a concept similar to the Harris corner detector. Using a 2×2 Hessian matrix (H), the principal curvature is calculated. If this ratio exceeds a predefined threshold, often 10, the keypoint is rejected. As a result, low-contrast keypoints and edge keypoints are eliminated, leaving just high-interest points.

In the third step, an orientation assignment is performed. In embodiments, each keypoint is then allocated an orientation to ensure that it remains invariant during image rotation. Depending on the scale, a neighborhood (e.g., an area) is drawn around the keypoint location, and the gradient magnitude and direction are determined in that region. In embodiments, an orientation histogram is generated with 36 bins encompassing 360 degrees (weighted by gradient magnitude and with a Gaussian-weighted circular window with σ equal to 1.5 times the scale of the keypoint). In embodiments, the highest peak in the histogram is used to compute the orientation, and any peak over 80% of it is also considered. In embodiments, this results in generating keypoints that are identical in position and scale but differ in direction.

In the fourth step, a keypoint descriptor is generated. In embodiments, a 16×16 neighborhood is taken around the keypoint. It is split into sixteen 4×4 sub-blocks. In embodiments, an 8-bin orientation histogram is produced for each sub-block. As a result, a total of 128 bin values are accessible. In embodiments, the bin values are encoded as a vector to create the keypoint descriptor. However, numerous countermeasures are made to provide robustness against variations in light, rotation, and so forth.

In embodiments, following keypoint detection, each image will have a number of keypoints and their associated descriptor vectors. Following that, correspondences are built between these descriptors. In embodiments, these techniques employ the Euclidean distance between descriptors. Accordingly, by finding their nearest neighbors, keypoints between two pictures are matched. In certain instances, the second closest match may be quite close to the first. This may occur as a result of noise or for other causes. In such a scenario, the ratio of the nearest proximity to the second-closest distance is calculated. They are rejected if the value is larger than 0.8. Accordingly, this removes around 90% of erroneous matches while discarding just 5% of genuine matches.

In embodiments following the establishment of keypoint correspondences between images, the transformation matrix H is estimated to distort the image by using the Random Sample Consensus (RANSAC) method, which is typically used to produce a reliable transformation matrix once false matches have been eliminated from the data set. In embodiments, the algorithm iteratively tests many match combinations and maintains only those that are the best match for the matches in question. Thus, the planar homography matrix H (3×3 matrix) relates the transformation between two planes, with s being the scale factor:

$$s\begin{bmatrix} x' \\ y^1 \\ 1 \end{bmatrix} = H\begin{bmatrix} x \\ y \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix}\begin{bmatrix} x \\ y \\ 1 \end{bmatrix}$$

After determining the transformation matrix, the perspective transformation is applied to the entire input image to obtain the final warped image. This is done by multiplying each individual pixel in the input image with the calculated homography matrix and obtaining the transformed output image. In embodiments, both the original image and the transformed image are provided. To stitch them together, both the first and second frames' pixels are placed onto a blank canvas.

In embodiments, border blending is used to smooth out variations in light and color across the stitching seam, resulting in a more homogeneous stitched scene. In real-world images, noticeable seams, blurring, or ghosting may occur. These could be due to exposure variations, misregistrations, or even moving objects. Creating clean, aesthetically pleasing panoramas is based on selecting which pixels to take and how to weigh them.

The systems, methods, and devices do not require employing image blending as it adds a noticeable overhead to the stitching pipeline and thus results in a lower frame rate in the output video. In alternate embodiments, two types of image blending may be used.

For example, alpha blending may be used. In embodiments, an alpha channel is utilized as an opacity channel. A pixel with a value of 0% in its alpha channel is entirely transparent, while a pixel with a value of 100% in its alpha channel is fully solid. The alpha channel can be considered a mask, as it describes how the colors of one pixel should be combined with those of another when the two are superimposed, one on top of the other.

Also, for example, pyramidal blending may be used. Rather than utilizing a fixed transition width, a frequency adaptive width is utilized. This is accomplished by building a band-pass (Laplacian) pyramid and making the transition widths a function of the level of the pyramid. To begin, each warped image is transformed into a Laplacian band-pass pyramid. After converting the masks associated with each source image to a low-pass (Gaussian) pyramid, a per-level feathered blend of the band-pass images is performed. Finally, the composite image is rebuilt by interpolating and adding all the pyramid levels (band-pass images).

In embodiments, once a stitched panorama is composed of three video streams, streaming of the stitched content from the laboratory's computer to the student's mobile device is conducted (e.g., using WebRTC broadcast system).

WebRTC is a free, open-source project that offers browsers real-time communication features through simple APIs. In embodiments, WebRTC enables the transmission of video, audio, and generic data between peers, enabling developers to create robust voice and video communication systems. The technique is compatible with all contemporary browsers and all major platform native clients. WebRTC technologies are implemented as an open web standard and are available in all major browsers as standard JavaScript APIs.

While WebRTC is described for streaming the stitched video content, other types of systems may also be used to send the streaming content.

In embodiments, MediaStream API (or another type of API) may be used and provides a JavaScript-based interface for accessing device cameras and microphones. It has some control over where multimedia stream data is consumed, and it also has some control over the devices that create the media stream data. It also makes available information on devices that are capable of capturing and rendering media.

The WebRTC standard is built around the Peer Connection, which is its central component. Participants can establish direct connections with their peers without the use of an intermediary server. To establish a video and an audio feed, clients plug the media obtained through the media stream API into the peer connection. Several events are happening in the background of the PeerConnection API as it is in charge of SDP negotiation, codec implementations, NAT Traversal, packet loss, bandwidth control, and media transmission.

To facilitate bi-directional data transfer of any sort of data directly between peers, the RTCDataChannel API was developed. Rather than depending on a TCP connection, which, although stable, has significant latency and is prone to bottlenecks, data channels make use of streams that use UDP and can be configured similarly to the Stream Control Transmission Protocol (SCTP) protocol, which was meant to imitate the WebSocket API. This architecture provides both dependable delivery in the same way as TCP does as well as less congestion on the network as UDP does.

To initiate a peer-to-peer video call, a connection between the two clients must be established between the two computers. This is achieved through the use of signaling. Despite the fact that signaling is beyond the scope of the WebRTC standard, it is a necessary initial step in establishing an audio/video connection.

Signaling, as described herein, enables the metadata exchange between two endpoints (senders, receivers, or both) to coordinate communication and establish a call. For instance, before two endpoints may initiate a video call, one must initiate the call, and the other must answer. This call-and-response message flow contains critical information about the streaming that will occur—the number and types of streams, how the media will be encoded, and so on—and is frequently formatted using the Session Description Protocol (SDP). The SDP is a standard format used by various real-world systems, including VOIP and WebRTC.

After signaling, the two endpoints must initiate the NAT (Network Address Translation) traversal process. NAT Traversal is a technique for circumventing the limitations of IP address translation. Three critical standards are utilized in WebRTC to overcome these obstacles: Interactive Connectivity Establishment (ICE), Session Traversal Utilities for NAT (STUN), and Traversal Using Relays around NAT (TURN)

It is also necessary to compress the media before delivering it via a peer-to-peer connection. In our existing Internet infrastructure, raw audio and video size is too large to be transmitted efficiently. Similarly, after receiving material over a peer-to-peer connection, it is necessary to decompress it. WebRTC has specified the use of three audio codecs and two video codecs, which are as follows: Audio-PCMU (G.711μ); Audio-PCMA (G.711a); Audio-Opus; Video-VP8; and Video-H.264/AVC During the development of WebRTC, several security measures were put in place, including encryption. Encryption is a required component of WebRTC and is imposed on all aspects of the connection establishment and maintenance processes. The Perfect Forward Secrecy (PFS) ciphers in a Datagram Transport Layer Security (DTLS) handshake is utilized to share critical information securely. Audio and video key data can then be used to generate Advanced Encryption Standard (AES) keys to encrypt and decrypt the media by the Secure Real-time Transport Protocol (SRTP). All of these technologies will result in a secure communication channel for use among WebRTC clients.

First, a simple Socket.io server is created. We then use the Socket.io events to establish a WebRTC connection. The observing clients and broadcaster will use these events to establish a peer-to-peer connection. Next, we provide a simple layout for the broadcaster to view in HTML.

Once the stitched video has been fetched through WebRTC, the stitched video is correctly projected to the user to give an immersive VR experience. To do so, an open-source web-based video player called VideoJS. In embodiments, VideoJS is a web-based video player designed to run on the new HTML5 standard. The video player supports HTML5 video and Media Source Extensions. In addition, VideoJS supports video playback on desktops and mobile devices. VideoJS also supports plugins that can be installed on top of the standard video player. VideoJS-VR is a VideoJS plugin that transforms an HTML5 video element into a panoramic 360 video player. It also supports projecting videos onto various shapes for different kinds of VR headsets.

In embodiments, a robot system is in charge of placing the wiring connections to the correct pins. First, two linear sliders may be positioned along the Y-axis, followed by a third one on the X-axis on top of the other two. These linear sliders utilize 360-degree rotating servo motors, which move the sliders to the necessary position in response to the controller movement. When the user initiates a movement with the controller, a linear actuator connected to the X-axis slider moves to collect a magnetic wire from the magnetic wires deck. In embodiments, the linear actuator moves it to the appropriate pin location. In embodiments, when the actuator reaches the pin location, an electric magnet activates the wire, which is then attached to the PCB pin. To meet the need for having a board for each course, PCB boards have been designed for digital circuits, electric circuits, electronics, and microprocessors courses. The designed boards include all the lab experiments for these four courses in embodiments. Additionally, Arduino serves as the central processing unit in the proposed system, as it connects the whole system, communicates to Firebase, and controls the sliders.

In embodiments, a Bluetooth controller may be used by the user to allow the user to control the wiring sliders remotely. To do so, the Bluetooth controller may be connected to a mobile phone that will receive the commands from the controller through the electronic application. In embodiments, the Bluetooth controller consists of five main components: (a) a battery which is the main power source for the controller to function; (b) an Arduino Uno WiFi Rev2 which is the micro-controller of the controller that takes input from the (c) Analog-stick and transfer it to the (d) Bluetooth Module which in return will transmit those controls to the mobile phone, and (c) a push button that is used to switch between control modes.

Furthermore, a wiring control mode is also provided, which is the main controlling mode that is set by default when the controller is started. In embodiments, this mode controls the wiring sliders as their movement in the Y-Axis using the Y-Axis in the Analog-stick and X-Axis using the X-Axis in the Analog-stick. In addition to placing and removing the wires by controlling the Z-Axis (the linear motor actuator), an electric magnet using the push button is integrated internally into the Analog-stick. The user can press the switching push button once to enter this mode from any other mode. In embodiments, a first power supply control mode is also provided. This control mode increases and decreases the voltage supplied to the circuit from the first power source. Thus, the user can increase the voltage by moving the Analog-stick to the positive side of the X-Axis and decreasing it by moving the Analog-stick to the negative direction of the X-Axis. To enter this mode from any other mode, the user can press the switching push button twice rapidly.

In addition, a second power supply control is also provided. This control mode is responsible for increasing and decreasing the voltage supplied to the circuit from the second power source. It has the same controls as the previous mode. To enter this mode from any other mode, the user should press the switching button three times in a row. In embodiments, the potentiometer control mode controls the potentiometer in the electronics experiments. In embodiments, the user can increase the resistance by moving the Analog-stick to the positive side of the X-Axis and decrease it by moving the Analog-stick to the negative direction of the X-Axis. The user can press the switching push button four times in a row to enter this mode from any other mode.

In embodiments, an electronic application (downloaded onto a mobile device, such as a smartphone or laptop, a computing device, a desktop, etc., or any other with a display screen) is provided that uses Ionic Framework, which is an open-source mobile UI toolkit for building a cross-platform, high quality web app and native experiences. In embodiments, the electronic application consists of two main pages: the Bluetooth Connection Page and the VR Stream Viewer Page.

Figure 14:
FIG. 14 is a diagram of an example electronic application page.
Figure 14:

In embodiments, the Bluetooth connection page is the first page that appears when the user starts the app, as shown in FIG. 14. On this electronic page, the user is required to connect to the Bluetooth controller designed.

Figure 15:
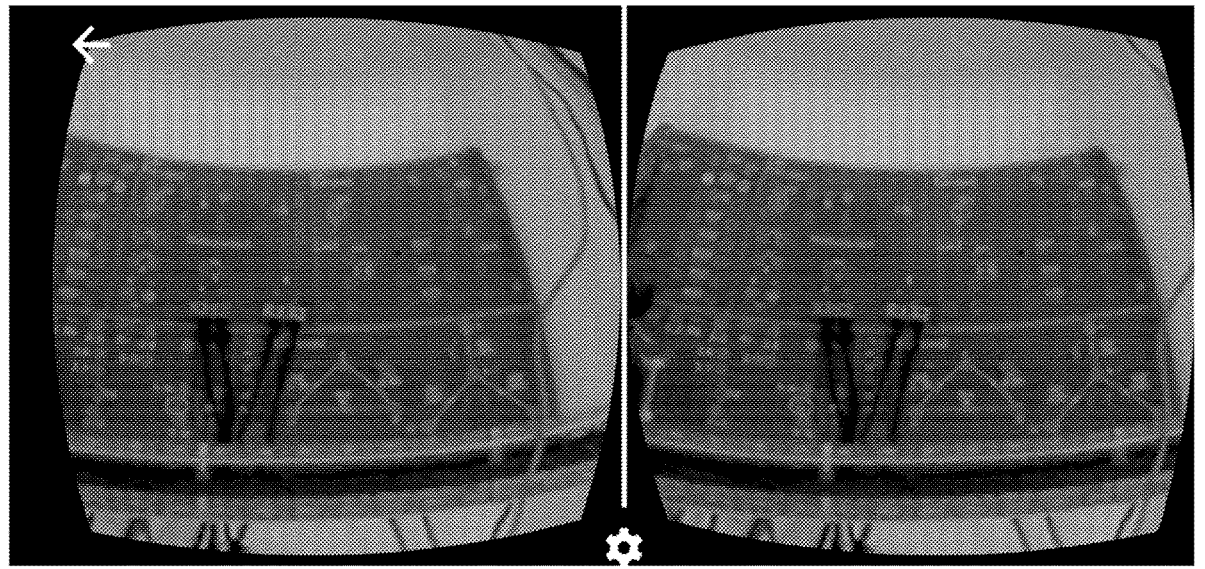
FIG. 15 is a diagram of an example of the VR View Page.

In embodiments, a VR view page is an electronic page of the electronic application that is accessed after the user connects a Bluetooth controller. In embodiments, this electronic page has two operations. The first operation is to read controls from the connected Bluetooth controller and send those readings to the Firebase RTDB to be retrieved later by the Arduino on the lab side. The second operation is to display the VR stream that is being transmitted from the cameras available in the lab as shown in FIG. 15.

Figure 16:
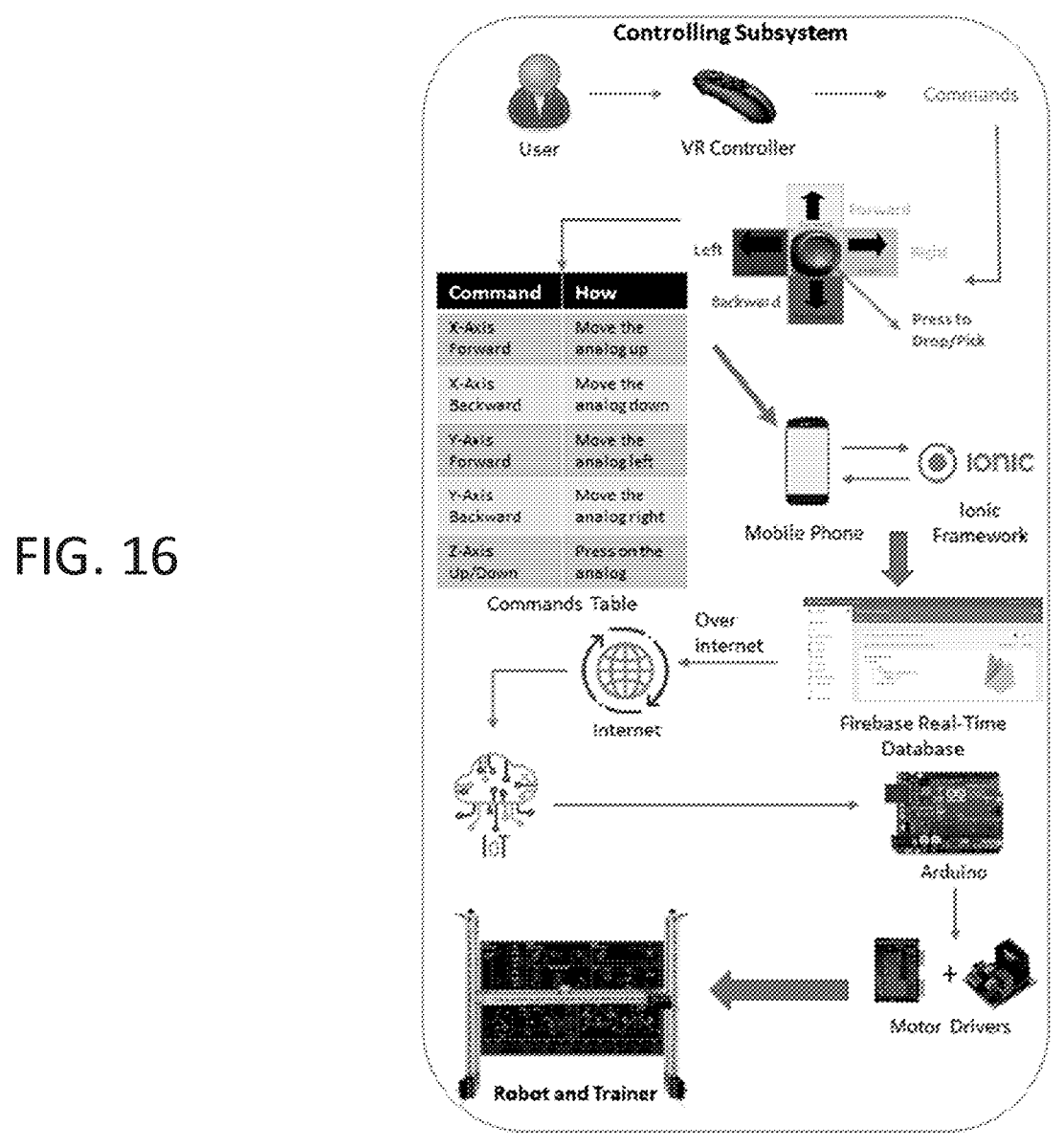
Figure 17:
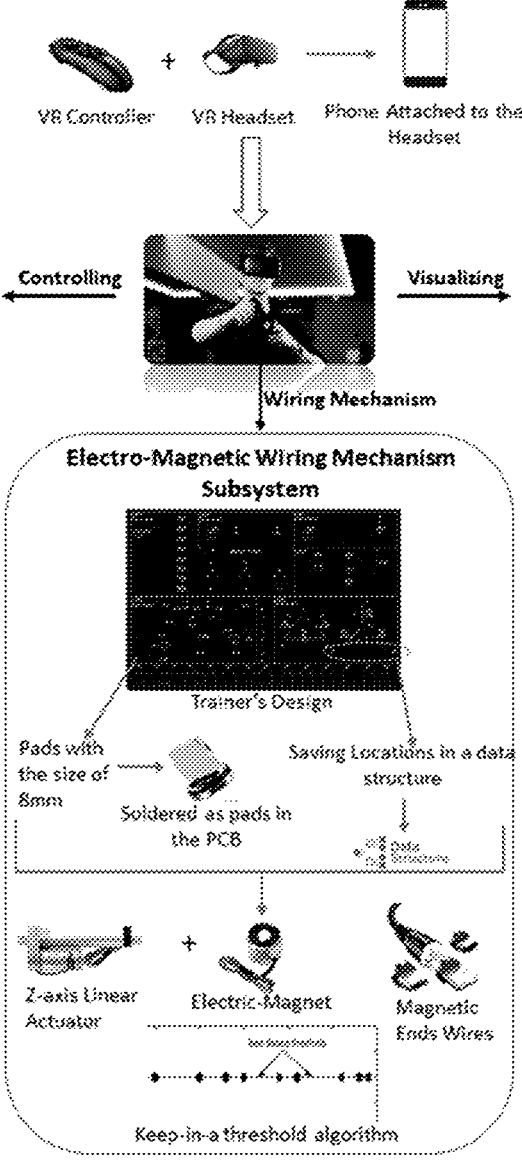

FIGS. 16, 17, and 18 describe an overview of the proposed control system. In embodiments, the control system consists of three subsystems, each subsystem having its own contribution to make up the end-to-end system. In embodiments, the first subsystem, shown in FIG. 16, consists of a controlling system. Furthermore, the control system uses a cross-platform mobile application to transmit commands from the end-user to the microcontroller, controlling the sliders in the lab. Once a command is received from a user, the mobile application uploads it to the cloud. In embodiments, uploaded commands are then delivered to the microcontroller connected to the trainer in the lab. In embodiments, the trainer design has linear actuators connected to it to move around specific locations on the board, which defines the trainer board's pin locations. In embodiments, the trainer board is also connected to pre-set multi-meters, an oscilloscope, and a function generator. At the lab end, the microcontroller checks if the angle has changed in the database.

When updated/changed, the Arduino starts giving commands to the motors controlling the robotic arm. In embodiments, the second subsystem, described in FIG. 17, is the visualization subsystem. In embodiments, the visualization subsystem's task is to generate the VR environment. With cameras streaming a live lab session, the server stitches the frames received from the cameras using our stitching algorithm and streams the stitched frame using webRTC protocol over the internet on a web page using videoJS library. In embodiments, the user then uses the mobile app to access the web page and shows the stitched video stream to the user while the user is wearing the VR headset.

In embodiments, the third subsystem, described in FIG. 18, is an electromagnetic wiring mechanism and subsystem. In embodiments, this subsystem concentrates mainly on designing the PCBs and the wires to place the connections. This subsystem aims to take the Arduino's commands and move the Z-axis linear actuator to pick up and place the wires in the desired position. Furthermore, this third subsystem is also responsible for showing a picture-in-picture view of a live stream of the PCB with a camera mounted in the robotic arm.

Figure 19:
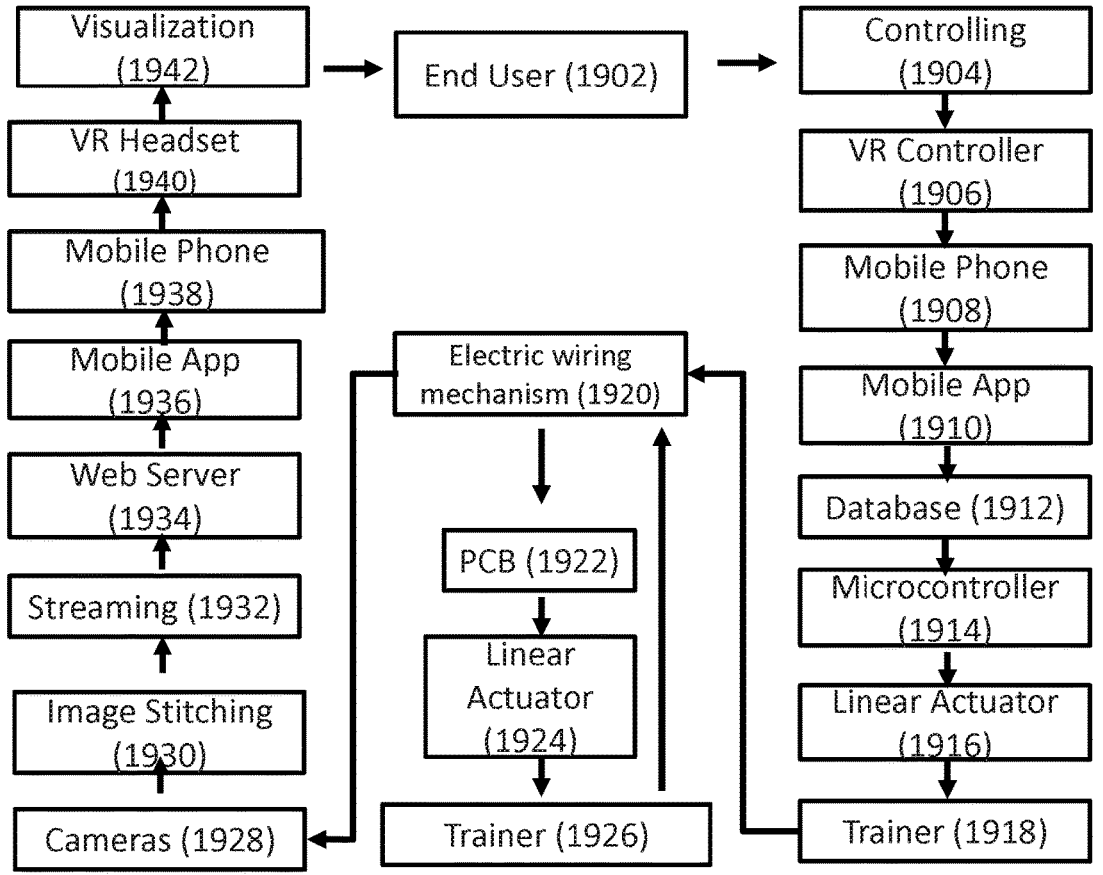
FIG. 19 is a diagram of an example flowchart.

In embodiments, the control system process is also described in FIG. 19. In embodiments, the flowchart in FIG. 19 describes the process. The process begins with the end user device 1902, which interacts with the system through two main pathways: visualization and controlling. On the visualization side, the user wears a VR headset, which is connected to a mobile phone (user device 1902). In embodiments, user device 1902 runs an electronic application that communicates with a web server, streaming real-time data from the lab environment. The streaming content is produced by cameras in the lab, which capture multiple angles of the trainer board. These camera feeds are processed through an image stitching algorithm, which combines them into a seamless virtual scene for the user. This entire setup is supported by an electric wiring mechanism, which connects the trainer's physical components to the system. On the controlling side, the user operates a VR controller 1906 to issue commands to the trainer. Like the visualization pathway, these commands are transmitted through a mobile phone and processed by the same mobile app. The commands are then sent to a database, which communicates with a microcontroller responsible for executing the actions. The microcontroller controls linear actuators, which perform precise movements on the trainer board. These movements manipulate the physical components, such as connecting wires, which are displayed in real-time in the user's VR headset. The PCB and linear actuators are integrated into the trainer, facilitating hands-on experiments remotely. This entire system allows students to perform lab work virtually, controlling real equipment from a distance, and receiving immediate feedback through both the VR visualization and precise control actions.

Figure 20:
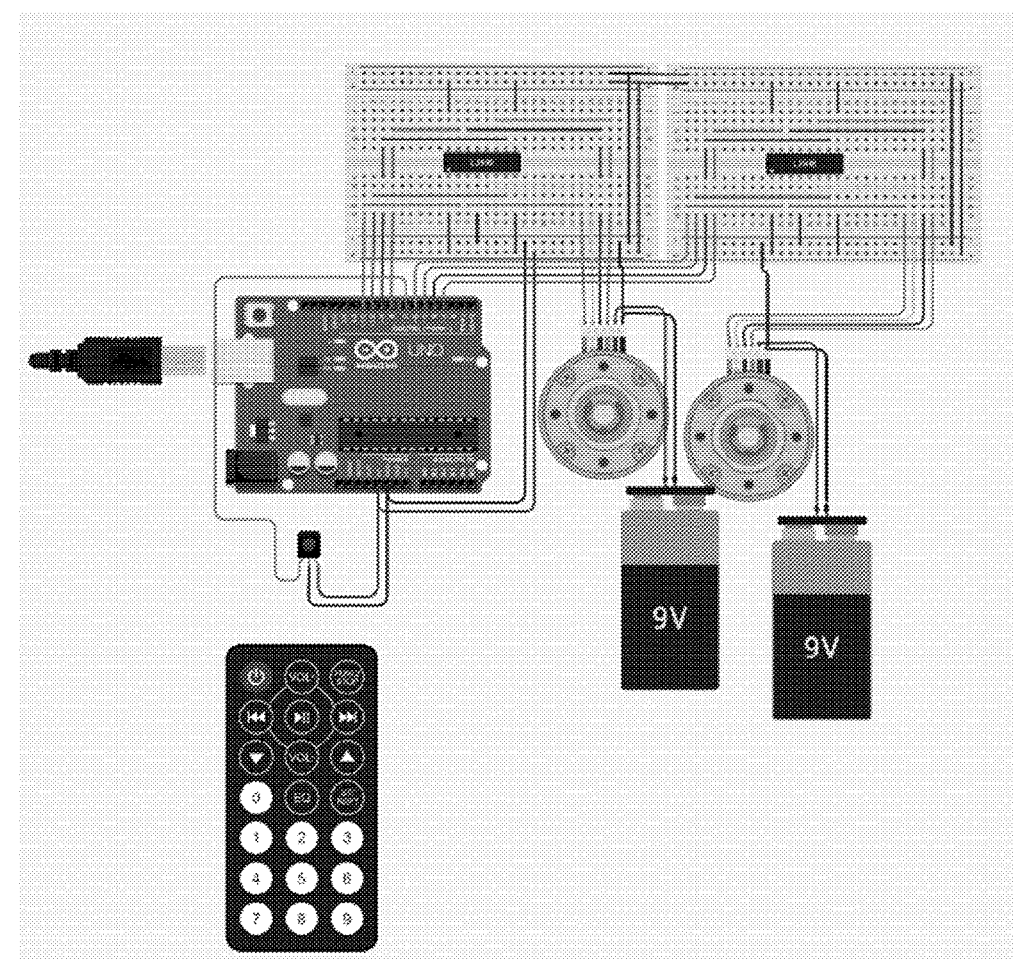
FIG. 20 is a diagram of an example schematic design.

In embodiments, a robot simulation on a Tinkercad tool is determined for the system's controlling subsystem. FIG. 20 shows the hardware schematic of the Tinkercad simulation used in the robot. In embodiments, the system contains two stepper motors, two H-Bridges, an Arduino UNO microcontroller, two 9V power supplies, and a remote controller. In this system, the command sending is simulated by a controller to move the stepper motors, which are supposed to move the sliders.

In embodiments, the Arduino UNO microcontroller controls the robotic arm's X and Y axes. Each axis is controlled by a servo motor, which is attached to the MCU. In embodiments, the MCU first retrieves and reads the Bluetooth controller's values from Firebase before determining if the angle of the analog stick is greater than a particular threshold, causing the robotic arm to move in that direction. In embodiments, each servo can be moved by simply providing the desired angle to the write( ) function.

In embodiments, the Bluetooth controller used to control the wiring sliders operates at four different modes. This includes Wiring Control Mode which is the default mode and is used while the user is experimenting. The analog stick in the controller controls the x-axis and y-axis positions of the end effector. This mode is reached by clicking the switching push-button once. The second mode is the First Power Supply Control Mode which is a control mode that increases and decreases the voltages from the initial power source provided to the circuit. This mode is reached by clicking the switching push-button twice. The third mode is the Second Power Supply Control Mode: This control mode increases and decreases the voltages from the secondary power source provided to the circuit. This mode is reached by clicking the switching push button three times. The fourth mode is the Potentiometer Control Mode which allows the user to adjust relevant potentiometers throughout the experiments' circuit boards. This mode is reached by clicking the switching push button four times.

In embodiments, the designed cross-platform electronic application establishes a Bluetooth connection with the controller. The Ionic framework provides ready-made functions allowing two Bluetooth-enabled devices to communicate. Moreover, the readings from the VR controller are read and sent to the mobile phone by using an Observable Interval to keep reading the incoming buffer of commands. Once the commands are read, the Firebase database variables are set accordingly.

Figure 21:
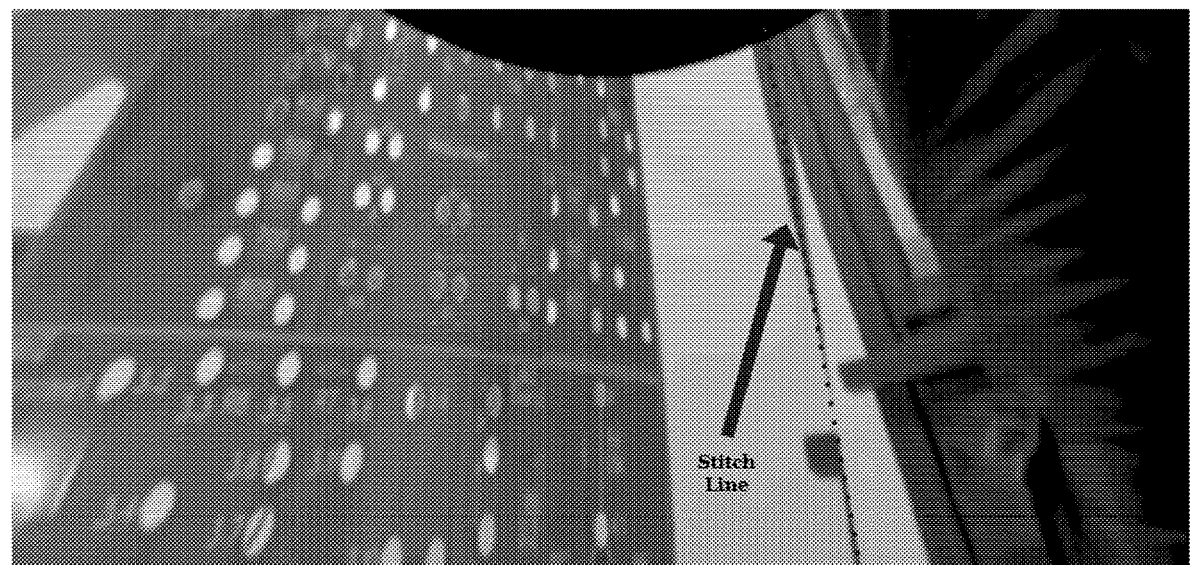
FIG. 21 is a diagram of an example stitching process

FIG. 21 is a figure that describes the result of stitching three video streams captured using three cameras that can be reprojected for a 180-degree view. In other examples, different quantities of cameras may be used. In embodiments, the three video streams are stitched by passing them to the designed real-time stitching pipeline and obtaining a stitched panorama. In embodiments, the stitched panorama is then later streamed to the user through the WebRTC conferencing tool. Moreover, since the system uses a less computationally intensive stitching pipeline (such as by not including a frame blending stage), stitch lines can become apparent in some cases when not enough details have been captured and detected during the keypoint detection stage.

However, the frame rate and the overall performance of the stitching pipeline can be improved at the expense of the aesthetics and the look of the stitched panorama. This is shown by observing the stitch line, as shown in FIG. 21, and noticing how it forms a discontinuity in the overall panorama. In addition, since the stitched panorama is not displayed using an equirectangular projection, the panorama might look a bit distorted around the poles, or more specifically at the top and bottom parts of the video. This issue can be overcome if fish-eye type lens cameras are used along with a different stitching method instead of the current approach.

Figure 22:
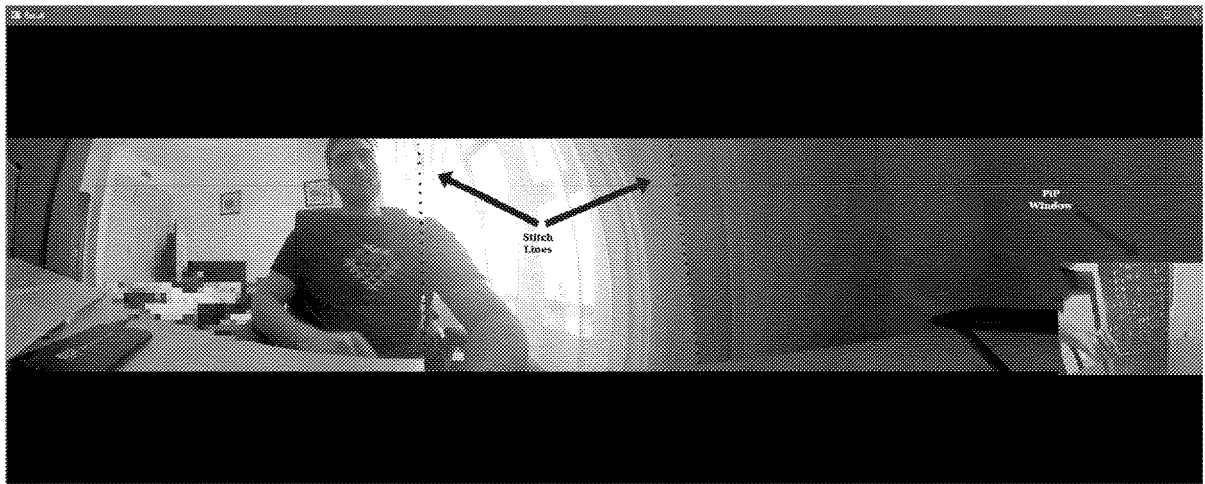
FIG. 22 is a diagram of an example stitching process.

Another description of stitching three video streams captured by the same cameras without reprojection is shown in FIG. 22. In embodiments, the shown seam lines are also visible as the design does not incorporate frame blending. In embodiments, the frames are stitched as described above. Additionally, the output panorama includes a Picture-in-Picture (PiP) window containing a sample video that plays concurrently with the stitched panoramic video. This PiP window can display the output of the camera mounted on the robotic arm during the laboratory experiment. In embodiments, the attached camera's objective is to offer a closer view of the PCB that is being remotely wired. When conducting a laboratory experiment, the main cameras may be adequate; however, adding an extra camera positioned on top of the robotic arm can offer a closer view and better expose the connections being made.

FIG. 23 describes the result of real-time WebRTC streaming after stitching the input videos. In embodiments, the WebRTC tool accepts input from a capture device that can be used to stream its content. In embodiments, OBS Studio can be used to accept the stitched panorama and output it to the WebRTC tool for it to be streamed to the user over the internet. As shown in FIG. 23, there can be a drop in the quality of the streamed videos. This is to be expected as the WebRTC protocol by itself compresses media files before transporting them. Although this process reduces latency and improves performance, it degrades the quality of the stitched panorama and alters the original resolution of the input video. Furthermore, the VideoJS-VR player allows the user to move around the stitched video. In embodiments, the video can be moved around by either clicking and dragging the mouse inside the video frame (if on a computer) or by moving the smartphone in space and sending different inertial measurements to the browser (if on a mobile device).

In embodiments, the designed WebRTC tool uses Hypertext Transfer Protocol Secure (HTTPS) to establish security between its broadcaster (university lab) and its viewer (student at home). Secure Sockets Layer (SSL) is the secure component of HTTPS. It encrypts and protects any sensitive data transmitted between two computers. Moreover, since mobile devices are the main target devices for using the designed WebRTC system, inertial measurements of the smartphone cannot be sent over insecure HTTP connections. This, in turn, mandates that the tool utilizes HTTPS and provides a secure way to exchange information.

Users may view various shape projections with the VideoJS-VR library integrated into the WebRTC tool. The tool can handle 360-degree, 180-degree, equirectangular, and cube projections. In embodiments, the stitched panorama's field of view (FOV) is large enough to accommodate a 180-degree view. Consequently, the VideoJS-VR player is configured to project the incoming panorama into a 180-degree video. The user may see everything in front of them while seeing nothing in the back. As shown in FIG. 23, if the user attempts to look behind them, a black region appears, and the video player stops moving in that direction and cannot exceed 180 degrees.

In embodiments, a linear actuator can be used to grab the magnetic wire from point A. The robotic arm's movement is controlled by a Bluetooth controller, responsible for initiating movement signals in response to the user's input. Once the robotic arm is positioned above the pin location, the linear actuator equipped with an electric magnet moves and grabs the magnetic wire. After the magnetic wire is attached to the electric magnet, the robotic arm moves towards point B according to the controller signal. When the robotic arm reaches point B, the linear actuator lowers into the pin location and connects the magnetic wire.

Additionally, all pin positions on a designed PCB board contain metal pieces that allow the magnetic wire to connect to the pin when it reaches the magnetic field of the pin. Multiple tests were done to ensure that the wiring system was efficient and precise in order to achieve the desired results. To begin, the distance between each pin on the printed circuit board has been calculated and adjusted appropriately to ensure accurate connections. Second, metal pads have been precisely sized to ensure that they fit inside the pins. Finally, to ensure the system is efficient, many wire designs with various magnet sizes can be used for the final design that produces the best results.

Accordingly, a Bluetooth controller is provided that can send communications to an electronic application without difficulties.

Figure 24:
FIGS. 24, 25, 26, 27, and 28 are diagrams of example electronic application pages.
Figure 25:
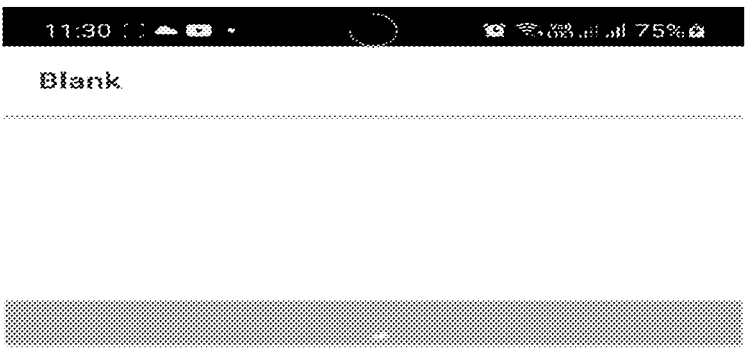
Figure 26:
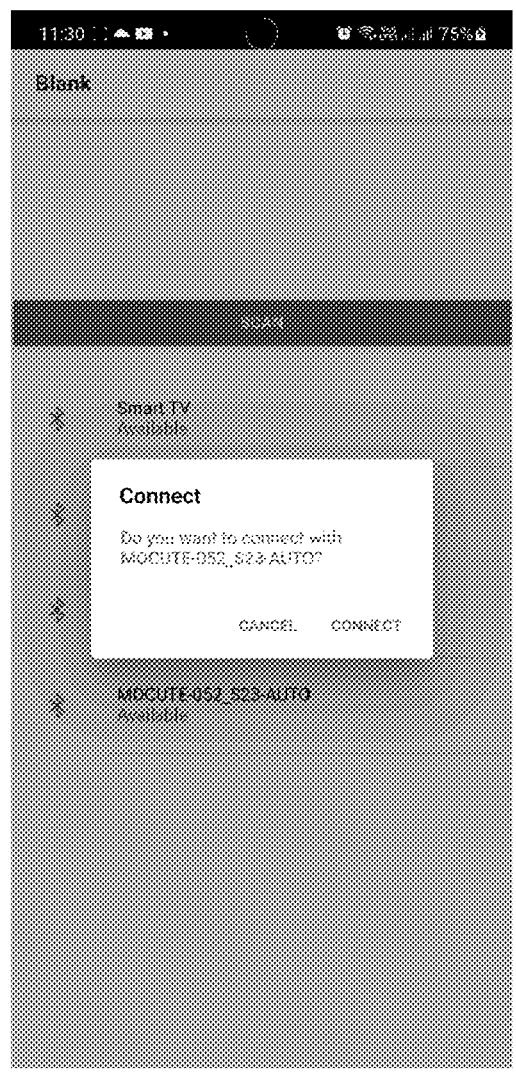
Figure 27:
Figure 28:

FIG. 24 describes an electronic page displayed by the electronic application. In embodiments, this page contains a "scan" button as shown in FIG. 24. In embodiments, when the user clicks on this particular button, the electronic application will provide responsive feedback on the processes being done in the background, as shown in FIG. 25. While the electronic application is scanning, there will be new items under the button where each one represents a discovered Bluetooth device. Each item has a Bluetooth logo at the left, the Bluetooth device in the middle, and that device's status under its name, as shown in FIG. 27. When a device is selected, an alert will pop up for confirmation of the connection, as shown in FIG. 26; once approved, the status will change to "connecting . . . "; when the device connects successfully, the status will change to "connected", and the device's name will be bolded (or highlighted, or colored differently) as shown in FIG. 28. In case the connection fails, the status will change to "couldn't connect." In embodiments, the "next" button at the button of the page remains disabled until a Bluetooth device is connected, but once enabled it takes you to the "Communication" page.

Accordingly, as shown in FIG. 28 we have two main functionalities in this view. Firstly, it receives the commands from the Bluetooth controller using the "BluetoothSerial" API. After acquiring the commands from the controller, the electronic application will send those commands immediately to the Firebase RTDB for it to be read by the Arduino placed in the lab. Secondly, the electronic application will have a "View Stream" button; once clicked, the VR stream being transmitted from the lab side over the internet using WebRTC will be displayed. In embodiments, this stream is viewed in VR mode, which splits the screen in two halves, as shown in FIG. 15. To view this stream in the right way, the phone can be placed inside a VR Headset.

Figure 29:
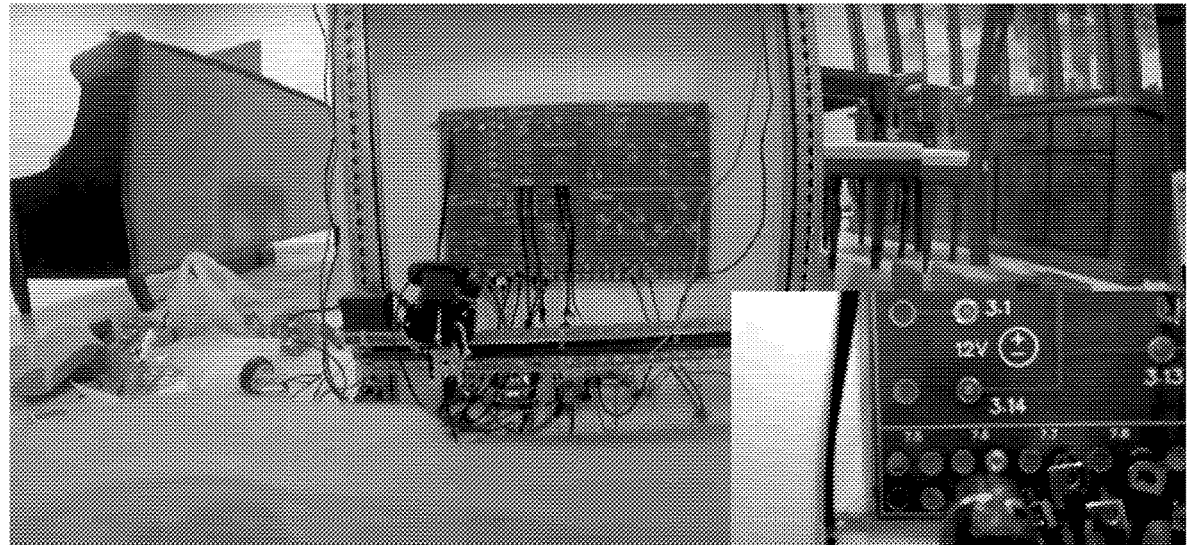
FIGS. 29 and 30 are diagrams of example applications of a VR control system.

FIG. 29 describes a 360-degree view after the stitching, including the picture-in-picture view coming from the camera mounted on the robotic arm. As shown in FIG. 29, the user can see the robot and the PCB, which are on a platform that holds them together. In embodiment, the picture-in-picture view here can help the end-user see the robotic arm's position clearly. This can make the mechanism of connecting the circuit easier to the user.

Figure 30:
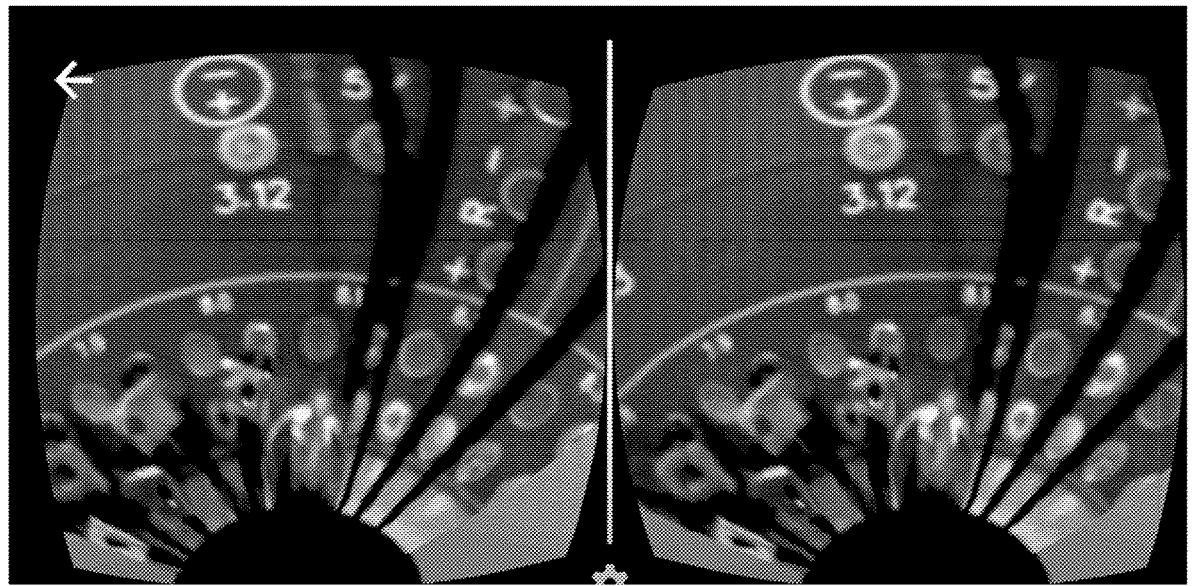

FIG. 30 demonstrates the user's view of the picture-in-picture video stream. This allows the user to view the board very clearly so the user can carefully place the wires in their place without any problems.

Figure 31:
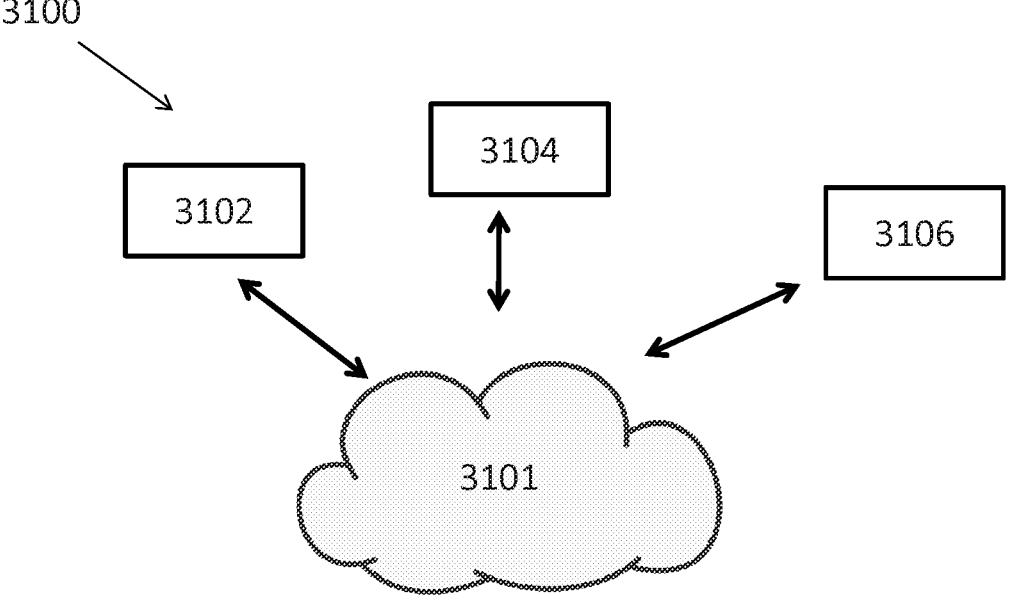
FIG. 31 is a diagram that describes an example networking environment.

FIG. 31 is a diagram of example environment 3100 in which systems, devices, and/or methods described herein may be implemented. FIG. 31 shows network 3101, virtual reality controlled system 3102, user device 3104, and user device 3106. Network 3101 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks.

Additionally, or alternatively, network 3101 may include a cellular network, a public land mobile network (PLMN), a second generation (2G) network, a third generation (3G) network, a fourth generation (4G) network, a fifth generation (5G) network, and/or another network. In embodiments, network 3101 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications. In embodiments, network 3101 may include a cloud network system that incorporates one or more cloud computing systems.

Virtual Reality Controlled System 3102 may include any computation or communications device that is capable of communicating with a network (e.g., network 3101). For example, Virtual Reality Controlled system 3102 may include a single board computer (SBC) (e.g., a Raspberry Pi device), a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

Virtual Reality Controlled System 3102 may receive and/or display electronic content. In embodiments, the electronic content may include objects, data, images, audio, video, text, files, and/or links to files accessible via one or more networks. Content may include a media stream, which may refer to a stream of electronic content that includes video content (e.g., a video stream), audio content (e.g., an audio stream), and/or textual content (e.g., a textual stream). In embodiments, an electronic application may use an electronic graphical user interface to display content and/or information via Virtual Reality Controlled System 3102. Virtual Reality Controlled System 3102 may have a touch screen and/or a keyboard that allows a user to electronically interact with an electronic application or a webpage (either containing electronic content). In embodiments, a user may swipe, press, or touch a portion of Virtual Reality Controlled System 3102.

Figure 32:
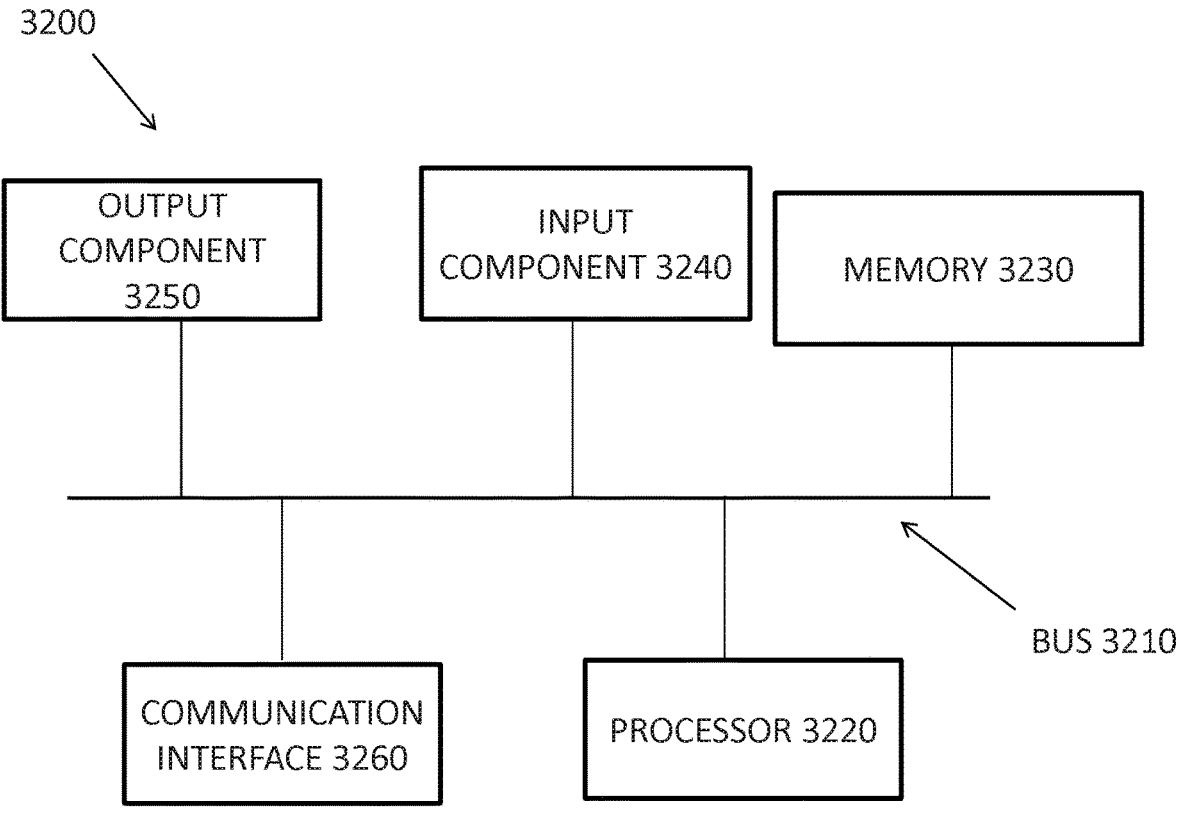
FIG. 32 is a diagram of an example computing device.

User devices 3104 and 3106 may include any computation or communications device that is capable of communicating with a network (e.g., network 2001). For example, user devices 3104 and 3106 may include a smartphone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device FIG. 32 is a diagram of example components of a device 3200. Device 3200 may correspond to network 3101, Virtual Reality Controlled System 3102, and/or user devices 3104 and 3106. Alternatively, or additionally, Virtual Reality Controlled System 3102 and/or user devices 3104 and 3106 may include one or more devices 300 and/or one or more components of device 3200.

As shown in FIG. 32, device 3200 may include a bus 3210, a processor 3220, a memory 3230, an input component 3240, an output component 3250, and a communications interface 3260. In other implementations, device 3200 may contain fewer components, additional components, different components, or differently arranged components than depicted in FIG. 32. Additionally, or alternatively, one or more components of device 3200 may perform one or more tasks described as being performed by one or more other components of device 3200.

Bus 3210 may include a path that permits communications among the components of device 3200. Processor 3220 may include one or more processors, microprocessors, or processing logic (e.g., a field programmable gate array (FPGA) or an application specific integrated circuit (ASIC)) that interprets and executes instructions. Memory 3230 may include any type of dynamic storage device that stores information and instructions, for execution by processor 3220, and/or any type of non-volatile storage device that stores information for use by processor 3220. Input component 3240 may include a mechanism that permits a user to input information to device 3200, such as a keyboard, a keypad, a button, a switch, voice command, etc. Output component 3250 may include a mechanism that outputs information to the user, such as a display, a speaker, one or more light emitting diodes (LEDs), etc.

Communications interface 3260 may include any transceiver-like mechanism that enables device 3200 to communicate with other devices and/or systems. For example, communications interface 3260 may include an Ethernet interface, an optical interface, a coaxial interface, a wireless interface, or the like. In another implementation, communications interface 3260 may include, for example, a transmitter that may convert baseband signals from processor 3220 to radio frequency (RF) signals and/or a receiver that may convert RF signals to baseband signals. Alternatively, communications interface 3260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 3260 may connect to an antenna assembly (not shown in FIG. 32) for transmission and/or reception of the RF signals. The antenna assembly may include one or more antennas to transmit and/or receive RF signals over the air. The antenna assembly may, for example, receive RF signals from communications interface 3260 and transmit the RF signals over the air, and receive RF signals over the air and provide the RF signals to communications interface 3260. In one implementation, for example, communications interface 3260 may communicate with network 3201.

As will be described in detail below, device 3200 may perform certain operations. Device 3200 may perform these operations in response to processor 3220 executing software instructions (e.g., computer program(s)) contained in a computer-readable medium, such as memory 3230, a secondary storage device (e.g., hard disk.), or other forms of RAM or ROM. A computer-readable medium may be defined as a non-transitory memory device. A memory device may include space within a single physical memory device or spread across multiple physical memory devices. The software instructions may be read into memory 3230 from another computer-readable medium or from another device. The software instructions contained in memory 3230 may cause processor 3220 to perform processes described herein. Alternatively, hardwired circuitry may be used in place of or in combination with software instructions to implement processes described herein. Thus, implementations described herein are not limited to any specific combination of hardware circuitry and software.

The above-described examples may be implemented in many different forms of software, firmware, and hardware in the implementations illustrated in the figures. In embodiments, the actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 32, to complete such actions. Also, it will be understood that any of the various actions can result in any type of electronic information to be displayed in real-time and/or simultaneously on multiple devices.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

sending, by a computing device, electronic communications to a first linear slider at a first location, and a second linear slider at second location, wherein the electronic communications include:

a first set of electronic communications configured to control the first linear slider that moves along an x-axis and control the second linear slider that moves along the y-axis of an electronic circuit board, wherein the first set of electronic communications are sent by pushing a button one time, a second set of electronic communications configured to increase or decrease voltage power being provided to the electronic circuit board, wherein the second set of electronic communications are sent by pushing the button two times, a third set of electronic communications configured to increase or decrease voltages from a secondary power source provided to the electronic circuit board, a fourth set of electronic communications configured to adjust potentiometers throughout the electronic circuit board;

receiving, by the computing device, multiple camera frames from a first location, wherein the first location includes first electronic imagery of an electronic circuit board and wherein the first electronic imagery is at a first angle view of the electronic circuit board;

receiving, by the computing device, additional multiple camera frames from the first location, wherein the first location includes second electronic imagery of the electronic circuit board, wherein the second electronic imagery is at second angle view of the electronic circuit board;

stitching, by the computing device, the multiple frames of a video in real time, wherein the stitching does not include frame blending, wherein the stitching includes:

determining, by the computing device, keypoints of varying scales based on scale-space filtering, wherein the first and second imagery include the keypoints;

performing, by the computing device, keypoint localization, wherein the keypoint localization is based on a Taylor series expansion of scale space;

determining, by the computing device, an orientation assignment for each of the keypoints, wherein the keypoints remain invariant during image rotation, wherein the orientation assignment is based on:

determining an area, of the electronic circuit board, around the keypoint location, determining gradient magnitude and direction for the area, generating an orientation histogram with 36 bins encompassing 360 degrees that is weighted by a gradient magnitude and a Gaussian-weighted circular window with σ equal to 1.5 times a scale of the keypoint, wherein the highest peak in the histogram is used to compute the orientation;

transmitting, by the computing device, stitched video frames to a user device, wherein the user device located at a second location is configured to control a device at the first location and wherein the user device is a virtual reality headset; and sending, by the computing device, additional electronic communications to three motors, wherein:

one of the three motors is used by a z-axis linear actuator to determine wire and connection placements on the electronic circuit board.

2. The method of claim 1, wherein the computing device is a robotic device.

3. The method of claim 1, wherein the stitching of the multiple video frames includes keypoint matching.

4. The method of claim 1, wherein the stitching of the multiple video frames includes frame wrapping.

5. The method of claim 1, further comprising:

identifying, by the computing device, specific locations within the multiple camera frames.

6. The method of claim 1, wherein the stitching of the multiple camera frames includes border blending, wherein the border blending smooths out variations in light and color across a stitching seam.

7. The method of claim 1, further comprising:

generating, by the computing device, a 360-degree view after the stitching of the multiple camera frames.

8. The method of claim 1, wherein each of the keypoints has descriptor vectors and wherein the descriptor vectors are used to match keypoints on different images.

* * * * *